United States Patent
Augst

(10) Patent No.: US 9,802,538 B2
(45) Date of Patent: Oct. 31, 2017

(54) METHOD FOR PROVIDING DRIVER INFORMATION IN A MOTOR VEHICLE

(75) Inventor: Alexander Augst, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1138 days.

(21) Appl. No.: 12/725,153

(22) Filed: Mar. 16, 2010

(65) Prior Publication Data

US 2010/0225762 A1    Sep. 9, 2010

Related U.S. Application Data

(63) Continuation of application No. PCT/EP2008/006737, filed on Aug. 16, 2008.

(30) Foreign Application Priority Data

Sep. 18, 2007 (DE) .................. 10 2007 044 535

(51) Int. Cl.
*B60R 1/00* (2006.01)
*B60R 1/04* (2006.01)
(Continued)

(52) U.S. Cl.
CPC .................. *B60R 1/00* (2013.01); *B60R 1/04* (2013.01); *B60R 1/12* (2013.01); *G08G 1/167* (2013.01); *B60R 2001/1215* (2013.01); *B60R 2001/1253* (2013.01); *B60R 2300/106* (2013.01); *B60R 2300/205* (2013.01); *B60R 2300/301* (2013.01);
(Continued)

(58) Field of Classification Search
None
See application file for complete search history.

(56) References Cited

U.S. PATENT DOCUMENTS 6,447,128 B1    9/2002  Lang et al.
7,206,017 B1 *  4/2007  Suzuki .......................... 348/36
(Continued)

FOREIGN PATENT DOCUMENTS

DE    198 45 567         4/2000
DE    199 61 313 A1      7/2001
(Continued)

OTHER PUBLICATIONS

German Search Report dated Jul. 31, 2008 including partial English translation (Nine (9) pages).
(Continued)

*Primary Examiner* — Christopher Findley
(74) *Attorney, Agent, or Firm* — Crowell & Moring LLP

(57) ABSTRACT

A method provides driver information in a motor vehicle, in which method a recording device of the motor vehicle captures an image flow containing images of at least one part of the environment of the motor vehicle. A display unit in the interior of the motor vehicle reproduces at least one image section of the image flow. A display control unit of the motor vehicle automatically modifies the environmental section shown to the driver by reproducing the image section using the display unit. During the reproduction of the image section, in addition to the representation of the environmental section, at least first optical information relating to the position of the environmental section relative to the motor vehicle is output to the driver.

13 Claims, 12 Drawing Sheets

(51) Int. Cl.
  *B60R 1/12* (2006.01)
  *G08G 1/16* (2006.01)
(52) U.S. Cl.
  CPC ..... *B60R 2300/302* (2013.01); *B60R 2300/50* (2013.01); *B60R 2300/70* (2013.01); *B60R 2300/8066* (2013.01)

(56) References Cited

U.S. PATENT DOCUMENTS

| | | | |
|---|---|---|---|
| 7,526,103 B2 * | 4/2009 | Schofield et al. | 382/104 |
| 7,717,841 B2 | 5/2010 | Brendley et al. | |
| 7,881,496 B2 * | 2/2011 | Camilleri et al. | 382/104 |
| 2002/0075387 A1 | 6/2002 | Janssen | |
| 2004/0201671 A1 | 10/2004 | Weis et al. | |
| 2004/0212676 A1 | 10/2004 | Mathes et al. | |
| 2005/0012685 A1 * | 1/2005 | Okada et al. | 345/32 |
| 2005/0033495 A1 * | 2/2005 | Tanaka et al. | 701/36 |
| 2005/0195383 A1 | 9/2005 | Breed et al. | |
| 2006/0210114 A1 | 9/2006 | Oka et al. | |
| 2006/0227214 A1 | 10/2006 | Fleury et al. | |
| 2007/0070197 A1 | 3/2007 | Akatsuka et al. | |
| 2008/0049105 A1 | 2/2008 | Shimizu et al. | |
| 2011/0102191 A1 | 5/2011 | Eggers et al. | |

FOREIGN PATENT DOCUMENTS

| | | |
|---|---|---|
| DE | 100 36 875 A1 | 2/2002 |
| DE | 201 18 868 U1 | 4/2002 |
| DE | 102 46 652 A1 | 4/2004 |
| DE | 103 36 329 A1 | 3/2005 |
| DE | 199 61 313 B4 | 6/2005 |
| DE | 10 2006 008 703 A1 | 9/2006 |
| DE | 20 2006 015 992 U1 | 1/2007 |
| DE | 10 2005 046 671 A1 | 4/2007 |
| DE | 103 21 228 B4 | 11/2007 |
| EP | 1 211 132 A2 | 6/2002 |
| JP | 2006-504166 | 2/2006 |

OTHER PUBLICATIONS

International Search Report dated Jul. 15, 2009 including English translation (Four (4) pages).

* cited by examiner

METHOD FOR PROVIDING DRIVER INFORMATION IN A MOTOR VEHICLE

CROSS-REFERENCE TO RELATED APPLICATIONS

This application is a continuation of PCT International Application No. PCT/EP2008/006737, filed Aug. 16, 2008, which claims priority under 35 U.S.C. §119 from German Patent Application No. DE 10 2007 044 535.2, filed Sep. 18, 2007, the entire disclosures of which are herein expressly incorporated by reference.

BACKGROUND AND SUMMARY OF THE INVENTION

The invention relates to a method for providing driver information in a motor vehicle, in which method a recording device of the motor vehicle captures an image flow containing images of at least one part of the environment, i.e., the surroundings of the motor vehicle, a display unit in the interior of the motor vehicle reproduces at least one image section of the image flow, and a display control unit of the motor vehicle automatically modifies the environmental section shown to the driver by reproducing the image section using the display unit.

Such methods have been disclosed in DE 100 36 875 A1, EP 1 211 132 A2, and DE 20 2006 015 992 U1. For example, a monitoring of the rearward vehicle environment can be improved by the devices described in these documents to the effect that a camera for rear-area monitoring is disposed directly on the rear end of the vehicle as a result of which the camera is positioned to more suitably view the close-in rearward vehicle environment than is a rear-view mirror disposed in front of the driver's seat by virtue of its functional principle. However, the documents specified above do not deal with measures for assisting the user in interpreting the environmental section represented.

It is an object of the present invention to provide a method by which a user is better assisted in interpreting the environmental section represented.

This and other objects are achieved by a method according to the invention, in which a recording device of the motor vehicle captures an image flow (e.g., MPEG video stream or a sequence of non-interlaced images) containing images of at least one part of the environment of the motor vehicle. A display unit in the interior of the motor vehicle reproduces at least one image section of this image flow. For example, the recording device can deliver an image flow comprising 1920×1080 pixels and the display unit reproduces a rectangular section of 240×180 pixels from this image flow. The environmental section represented by the display unit such as a TFT display is thus determined firstly by determining the image section of the image flow and secondly by determining that part of the environment that is represented in the image flow. The image flow itself can be limited to a relatively narrow portion of the environment such as the rear area of the vehicle. In the opposite extreme case, the image flow can also be formed into a panorama view of the vehicle environment. Particularly, one or more cameras can be used as recording device, and so can other imaging devices. In the case of several cameras used jointly simultaneously or alternately as recording devices, the individual cameras need not record those parts of the environment that happen to overlap or adjoin each other.

In the method according to the invention, a display control unit of the motor vehicle additionally automatically modifies the environmental section shown to the driver by reproducing the image section using the display unit; for example, the display control unit adapts the environmental section to changed ambient conditions or a change in the position of the motor vehicle. In order to adapt the environmental section, the recorded part of the environment can be adapted according to the above remarks by panning a camera used as the recording device or by switching over to another camera, and/or the reproduced image section is adapted. In the above example of a rectangular image section, in particular, its position in the image flow originally delivered by the recording means can be modified. The term "determination or adaptation of the environmental section" is naturally not meant to connote an active intervention in the environment, but instead one of the measures addressed above relating to recording and/or reproduction. Particularly a purely virtual camera pan or a purely virtual camera switching can be carried out from the view of a user observing the display unit when the selected image section is shifted in the image or image flow recorded at a wide angle. Optionally, when the selected image section in the image or image flow recorded at a wide angle is selected to be larger or smaller, a virtual or digital zoom further takes place; that is to say, the aperture angle required by a camera in order to record the image section represented is changed.

The fact that the change in the environmental section is effected automatically relieves the driver of performing this change manually. However, it can also prove too taxing for him. As described above, when the display control unit adapts the represented environmental section such that a hazard source in the vehicle environment is displayed to the driver, a switchover or pan of the environmental section represented takes place without any effort on the driver's part. Particularly when this switchover or pan takes place very rapidly and/or when the driver cannot fully concentrate on observing the display unit due to the actual driving task, it may happen that the driver loses his orientation relative to the represented environmental section in the absence of further assistance. In order to prevent the same, according to the invention, the driver is provided with at least one lot of additional optical information from which he can identify the environmental section that is currently displayed to him. In other words, during the reproduction of the image section, in addition to the representation of the environmental section, at least one lot of optical information relating to the position of the environmental section relative to the motor vehicle is output to the driver. The observer is thus provided with the possibility of orienting and classifying the displayed environmental section in the overall environment.

The term "in addition to" must be understood to mean that the reproduction of the image section comprises more information than a mere representation of the environmental section; that is to say, more information than the pure image content of the image section determined by the display control unit. This information can be "packaged" in a special form of reproduction of the image section. The invention can thus be implemented by a reproduction of the image section alone if the image section is reproduced such that information, which extends beyond the pure image content and relates to the position of the environmental section relative to the motor vehicle, is delivered. Alternately or additionally, an additional visual display can be output in order to deliver such information.

The term "position of the environmental section relative to the motor vehicle" used above is meant to be understood at least as a horizontal direction, and additionally a vertical direction, if appropriate. Since the movement of the motor vehicle and other road users is substantially played back in a plane, mainly the horizontal direction of the environmental section relative to a reference axis of the motor vehicle, such as the vehicle longitudinal axis, is decisive for a successful interpretation of the environmental situation by the driver. However, in special situations, the vertical direction can also be of importance, for example, when the screen area is automatically oriented, depending on the situation, to a towering landmark in the vehicle environment.

According to a preferred embodiment of the present invention, the image section itself is reproduced—and thus, the environmental section is actually represented—as a function of the position of the environmental section relative to the motor vehicle. The idea of the invention is thus implemented particularly elegantly.

In such an implementation of the invention, the observer can also acquire information relating to the aforementioned position, in most cases based on a mere observation of the image section that is required anyway for detecting its contents. The driver then need not interpret any additional representation elements. There is also no requirement of any technical effort for providing such representation elements. The position-information delivered merely with the help of the reproduction of the image section itself can additionally be interpreted by most observers intuitively.

According to a preferred embodiment of the present invention, the image section is reproduced as a function of the position of the environmental section relative to the motor vehicle by arranging the image section, corresponding to this position, within a larger display surface of the display unit. The majority of observers can intuitively correlate between the position and the arrangement.

Particularly the display unit can be integrated into the reflecting surface of a rear-view mirror of the motor vehicle. The display unit itself can also be formed as the reflecting surface of the rear-view mirror, and the display surface that is not currently used for representing the environmental section can be transferred into a reflective state. In such an embodiment of the invention, the observer can easily recognize, based on the arrangement of the image section within the reflecting surface, the part of the environment currently displayed to him. The remaining parts of the mirror continue to be usable by the driver in the conventional sense.

According to another alternately or additionally applicable preferred embodiment of the present invention, the reproduction of the image section as a function of the position of the environmental section relative to the motor vehicle is implemented by reproducing the image section in a distorted manner corresponding to the position.

The distortion can be achieved by subjecting the image section to a geometric transformation that gives the observer the impression of a corresponding perspective. The distortion can alternately or additionally also be achieved by means of a curvature or a perspectively generated virtual orientation of the image section.

The majority of drivers can also intuitively correlate between such a distortion and the position to be represented. The combined use of distorting the image section, corresponding to the position, and arranging the image section, corresponding to the position, within a larger display surface is particularly effective. Easily interpretable representation results can also be achieved without any variation in the arrangement. It is also sufficient to have a smaller display surface without any variation in arrangement.

According to another alternately or additionally applicable preferred embodiment of the present invention, the reproduction of the image section as a function of the position of the environmental section relative to the motor vehicle is implemented in that the image section is arranged, corresponding to said position, in a defined plane of a three-dimensional representation.

Also a representation of the environmental section as a function of a zoom factor or aperture angle used for determining the environmental section or resulting from the determination of the environmental section can be advantageous. As a preferred variant of a reproduction of the image section as a function of this zoom factor or aperture angle, it is suggested that the image section be arranged, corresponding to said zoom factor or aperture angle, in a defined plane of a three-dimensional representation.

Alternately or additionally to the aforementioned embodiments, the representation of the environmental section can also be accompanied by a symbolic representation of the position of the environmental section relative to the motor vehicle.

This can also enable the observer an improved orientation and classification of the represented image section in the overall environment.

The same display unit that displays the image section itself preferably displays the accompanying symbolic representation. However, any other display device can also be selected or provided in the driver's field of view for the purpose of representation.

Alternately or additionally, information relating to a zoom factor or aperture angle used for determining the environmental section or resulting from the determination of the environmental section can be delivered to the driver by way of an accompanying symbolic representation.

The above remarks deal predominantly with the representation of an environmental section determined automatically by the display control unit.

Additional preferred embodiments and advantageous improvements of the invention described below will focus on the determination of the represented environmental section by the display control unit, which determination precedes the representation by virtue of its functional principle.

A preferred embodiment of the present invention pursues the goal of showing the driver, by means of the environmental section represented, exactly those image contents that are most likely to be of interest or use to him. This embodiment is based on the finding that particularly those road areas are to be considered as being of particular interest and/or use to the driver that have been traveled on by the motor vehicle itself (shortly) before. Since the trajectories of motor vehicles moving in traffic are typically strongly influenced by the routing and configuration of streets and roads, and lanes, there exists a particularly high probability, exactly at those locations where the subject vehicle has slowed down shortly before, of catching sight of a subsequent motor vehicle. In the use of a conventional rear-view mirror oriented such that it provides a view of the rearward vehicle environment substantially along the vehicle longitudinal axis, the aforementioned road area is typically not contained in the mirror image, particularly after strong changes of direction of the motor vehicle. Also known camera-based rearview systems do not offer any solution for the targeted monitoring of this road area in such situations.

For solving this problem, a device is provided for determining at least one previous position of the motor vehicle, in which device the environmental section represented by the display unit can be adapted automatically as a function of the previous position of the motor vehicle. The environmental section can thus be adapted such that particularly, and optionally even exclusively, those road areas are contained in the environmental section that have been traveled on previously by the motor vehicle. As remarked above, an adaptation of the environmental section involves adapting particularly the recorded part of the environment by panning a camera used as the recording devices or switching over to another camera, and/or the reproduced image section can be adapted.

The previous position to be determined and to be taken into account in the adaptation can be defined, for example, as the position at a defined point in time that dates back from the current point in time by a predetermined period of time or as the position trailing in relation to the current vehicle position by a longitudinally determined route. The at least one previous position can be determined e.g., relative to the current position of the motor vehicle and/or in absolute terms, e.g., in GPS coordinates.

The term "previous position of the motor vehicle" used here can be interpreted variably depending on the exact variant of implementing the invention. It can be understood to mean the center of gravity and/or the geometric center of the motor vehicle located above the roadway plane at the respective previous point in time. The term can also be understood to mean a projection of the center of gravity and/or geometric center above the roadway plane. Likewise, the term "previous position of the motor vehicle" used here can be understood, notwithstanding the actual wording "position," as "extended volume" or "extended surface." Within the meaning of a volume, the term can be understood to mean the volume filled out by the vehicle at the respective previous point in time, optionally approximated by a simplistic geometric model such as a parallelepiped. Within the meaning of a surface, the term can be understood to mean the area taken up by the vehicle on the roadway at the respective previous point in time, optionally approximated by a simplistic geometric model such as a rectangle. Such a surface can again be defined, depending on the embodiment, as one "lying" on the roadway or "floating" at a defined height above the roadway, for example, at the height of the center of gravity and/or geometric center.

When mention is made in connection with this embodiment of the invention, of a previous position of the vehicle being contained in an environmental section and the previous position being defined as the point or surface within the roadway plane, it means that the environmental section is determined such that the corresponding part of the roadway surface is contained in the environmental section unless it is hidden by another object. When mention is made in connection with this embodiment of the invention, of a previous position of the vehicle being contained in an environmental section and the previous position being defined as the point, surface or volume above the roadway plane, it means that the environmental section is determined such that a hypothetical object disposed at this point, in this surface or in this volume would be contained in the environmental section unless it were hidden by another object.

An embodiment of this invention that can be implemented with particular ease provides for determining the previous position only with respect to its direction relative to the current vehicle orientation. A considerable improvement over prior-art systems can be achieved by merely appropriately selecting the environmental section such that the latter is determined solely by the orientation of the effective viewing angle in this direction.

Due to the small vertical extension of the traffic-related parts of the vehicle environment—considering that the vehicle and all other road users move on the road surface—the previous position can be determined particularly effectively merely with respect to its horizontal direction relative to the current vehicle orientation.

Preferably, in addition to the direction of a previous position relative to the current vehicle orientation, at least the distance of the previous position relative to the current vehicle position is also determined and taken into account. This distance can be used accordingly for determining an effective zoom factor of the image section when determining the environmental section.

For the sake of simplicity, it is assumed below without loss of generality that due to the aforementioned small vertical extension of the traffic-related parts of the vehicle environment, no vertical determination of the image section is necessary over and above that vertical change of the image section that involves a zoom-in or zoom-out for changing the horizontal image section. Naturally, the idea of the invention can be implemented similarly taking into account the necessity of a vertical determination of the image section.

According to a particularly preferred embodiment of the present invention, included is a device for determining a plurality of previous positions of the motor vehicle; at least one preferred display section in the environment of the motor vehicle being determinable as a function of this plurality of previous positions and the environmental section being adaptable such that this display section is displayed. As a result of taking into account a plurality of previous positions of the motor vehicle, the environmental section can be adapted, to particular advantage.

As discussed above, each individual previous position can be formed as a point, surface or volume. Thus, the plurality of previous positions is basically formed as a point set, a line, a set of single surfaces, a tubular surface, a set of single volumes or a tubular volume. Without loss of generality, the previous positions discussed below will be regarded as being point-shaped. The plurality of previous positions is thus formed as a point set or a line.

The plurality of previous positions can be formed or can be present as a trajectory of the motor vehicle, for example. Such a trajectory can describe the previous path of motion of the motor vehicle continuously, quasi-continuously or as a value set. For restricting such a value set or value sequence, the most recent portion of the previous path can be recorded in a circular buffer or any other memory device in which older values are rewritten.

The display section can be understood to mean a required environmental section. If permitted by the technical parameters of the device, the environmental section can be adapted such that it exactly matches the display section. The environmental section is then determined or adjusted directly as a function of the plurality of previous positions. If appropriate, specific allowances can be made in this regard and the environmental section is adapted only essentially to match the display section.

In the simplest case, the display section can be determined as a direction relative to the current vehicle orientation. However, the direction can also be supplemented by a zoom factor, for example.

The previous positions can be determined and/or processed as absolute positions. For example, positional specifications of a satellite-based system for determining positions (e.g., GPS) can be used in this connection. In such a case, the preferred display section is also determined, at least initially, in absolute terms. In the case of a known current vehicle position and optionally vehicle orientation, the preferred display section determined in absolute terms can be converted into a preferred display section that has been determined relative to the current vehicle position and optionally vehicle orientation.

Alternately, positions and optionally orientations exclusively relative to the current motor vehicle position or vehicle orientation can be determined and/or processed as previous positions. For determining such relative values, particularly steering angle signals and/or speed signals and/or acceleration values measured using a gyroscope, for example, can be used.

The display section is preferably determined such that defined predetermined criteria, which must be met in connection with the previous positions, are fulfilled to the best possible extent.

For example, one criterion may be defined as the requirement for all positions occupied by the motor vehicle on a defined previous driven distance of predetermined length (e.g., one meter multiplied by the current speed measured in kilometers per hour), to be contained in the display section or in the environmental section. An additional criterion can be the requirement to select the display section or environmental section to be as small as possible in order to provide a good detail representation. If the display section or environmental section can be adjusted with the aid of the two parameters of direction and zoom factor, there usually exists an optimum value of these parameters, for which the two criteria, as a whole, are met to the best possible extent.

Alternately to such a criterion, a center of gravity of the plurality of previous positions can be determined, for example. The display section or environmental section can then be determined such that this center of gravity is located at the center of the display section or environmental section. Depending on the distance of the center of gravity from the motor vehicle, a zoom factor of the display section or the environmental section can be determined.

According to another particularly preferred embodiment of the invention, the display section or environmental section is determined such that it is delayed in time relative to a fictitious display section or environmental section that is constant relative to the vehicle. As a result of such a time delay that can be in the order of magnitude of a second, for example, in the case of a strong change of direction of the motor vehicle, the display section and thus also the represented environmental section are initially retained in the manner prevailing before the change of direction. Consequently, a subsequent vehicle does not immediately disappear from the represented environmental section in the case of a change of direction of the subject motor vehicle, but instead, it is possible to observe, for example, whether this subsequent vehicle is signaling by way of the blinkers or whether it is delivering other optical signals (e.g., headlight flashers) in order to warn the subject motor vehicle of the invention of the presence of a hazard at a turn. Such a time delay can also be advantageous in connection with determining the display section or environmental section according to other criteria.

According to another particularly preferred embodiment of the invention, the display section or environmental section is determined such that its time course is low-pass filtered in relation to a fictitious display section that is constant relative to the vehicle. Thus, a high-frequency part of the vehicle movement is filtered out or compensated. In the case of a double bend, on which the motor vehicle has traveled fast, or a rapidly executed lane change by the motor vehicle, the low-pass filtering can prevent the driver from losing a view of the rearward environmental area of the motor vehicle. Such a low-pass filtering can also be advantageous in connection with determining the display section or environmental section according to other criteria.

In many feasible algorithms for determining the display section or environmental section, a low-pass filtering and also a time delay are brought about, by virtue of their functional principle, by taking into account the previous positions of a previous time interval of defined length.

This effect can be reduced particularly by including the previous positions, depending on the extent to which they date back in time and/or their distance from the current vehicle position, with variable weighting, in the determination of the preferred display section or environmental section, and by weighting recent values more heavily. Other filter effects are possible if the previous positions, depending on the extent to which they date back in time and/or their distance from the current vehicle position, are included, with variable weighting, in the determination of the preferred display section or environmental section.

The preferred display section or environmental section is preferably determined based on a quality criterion. In doing so, it is possible, as mentioned above, to evaluate whether and/or where the previous positions of the motor vehicle are contained in the display section or environmental section.

In the simplest case, it is only evaluated whether defined previous positions of the motor vehicle are contained in the display section or environmental section at all. The display section or environmental section can then be determined clearly in most cases based on the requirement of selecting the smallest possible zoom factor and selecting the viewing direction such that the most extreme previous positions to be represented are located exactly in the border area of the display section or environmental section.

As an alternative or addition to the evaluation as to whether previous positions are contained in the display section or environmental section, it is also possible to carry out an evaluation to identify where the previous positions are contained in the display section or environmental section. If appropriate, one may anticipate the possibility of a previous position to be represented per se not being contained in the display section or environmental section, but other previous positions being represented even better.

If the display section or environmental section, to which a maximum or a satisfactory value of the quality criterion is assigned, can be determined directly, it is preferred to directly determine the display section or the environmental section accordingly. Otherwise, the display section can be determined by means of a search-step procedure or any other optimization procedure, if appropriate.

For the sake of simplicity, without loss of generality, the distinction will no longer be made below between display section and environmental section. However, it will be assumed in the subsequent description that a required environmental section is indeed determined in a defined manner, but the actually effectively adjusted environmental section does not exactly match the required environmental section at all times.

The environmental section is preferably adapted not only as a function of the at least one previous position of the motor vehicle but also as a function of the travel speed of the motor vehicle. Particularly, a wide-angled environmental section at low travel speed, e.g., in the case of parking maneuvers, can ensure an improved view. In contrast, at higher travel speeds, an environmental section that is focused at a narrow angle can be helpful for an improved view of those parts of the environment that are disposed farther off.

It can be advantageous if the environmental section is adapted not only as a function of the at least one previous position of the motor vehicle but also as a function of at least one future position of the motor vehicle.

Particularly, the preferred display section can be determined as a function of a predicted position and optionally a predicted spatial orientation of the motor vehicle. The prediction can precede the predicted future position of the vehicle by a predetermined period of time or a predetermined route of the motor vehicle. For example, the prediction can be made based on the current travel speed and/or the current steering angle. Also longitudinal and transverse acceleration values can be taken into account for improved prediction.

According to a particularly preferred embodiment of the present invention, the motor vehicle comprises a device for determining a plurality of previous steering angle values of the motor vehicle, and the display control unit determines at least one preferred environmental section as a function of the plurality of previous steering angle values. The steering angle values can be used particularly as the essential or the sole basis for determining previous positions of the motor vehicle, with the help of which the environmental section can then be determined. The previous steering angle values allow at least an approximate determination of the previous driving lane of the motor vehicle relative to its current position. The measurement devices and algorithms for implementing the invention can be configured easily with the support of steering angle values and the invention can be implemented effectively.

According to another particularly preferred embodiment of the present invention, the at least one previous position is determined, among other things, with the aid of electronic map data. Particularly, an entire previous trajectory of the motor vehicle or portions of such a trajectory can be determined based on a street course known from such an electronic roadmap. It is also contemplated to make additions or corrections in a trajectory with the help of a street course known from an electronic roadmap, if the trajectory derived otherwise is interrupted due to measurement errors or if it does not seem plausible.

Preferably, the environmental section can be adapted automatically depending on the situation, not only as a function of the at least one previous position of the motor vehicle but also as a function of additional state variables of the vehicle environment.

For example, it is contemplated to adapt the environmental section as a function of known hazard sources or other road users. The previous knowledge about hazard sources required for this purpose can also originate from an electronic roadmap. It can also be obtained wirelessly from a service provider. Information on the presence and, optionally, the exact position and/or additional data of other road users can be provided to the motor vehicle, for example, by means of vehicle-to-vehicle communication and/or vehicle-to-infrastructure communication.

If another road user, particularly another vehicle, is equipped with an RFID chip or other detectable features, this road user can be detected and localized based on a recognition of this chip by the subject motor vehicle or an infrastructure facility. The orientation of the recording device and/or the image section can then be adapted in such a way depending on the situation and a risk potential attributed to the other road user that the environmental section displayed includes the other road user.

In addition to other road users, other objects and states of the vehicle environment can also be detected with the aid of the RFID chip as the subject vehicle drives past the same. For example, the RFID-based detection and optionally localization of traffic signs, intersections, side-roads, junctions, traffic lights and parking facilities is conceivable. The environmental section can also be adapted depending on the situation as a function of such objects and the arrangement thereof relative to the motor vehicle.

The RFID detection can also relate to objects that do not directly concern the driving process, e.g., mailboxes, restaurants, cigarette vending machines, etc. The environmental section can also be adapted in such a way depending on the situation that such objects are displayed to the driver. The driver can thus be provided, for example, with an image representation of a free parking space in the vehicle environment.

In addition to the RFID-induced adaptation of the environmental section represented, the display unit provided as suggested by the invention can display at least one lot of information, which is read out from the respective RFID chip and which relates to the object equipped with the RFID chip. Instead of the display of information with the aid of the display unit, naturally any other information-exchange unit can also display the information. The image section can be adapted in such a way, as mentioned above, that a free parking space is displayed to the driver in the environmental section represented. Moreover, the amount of the parking fee incurred for using the parking space can also be read out as additional information from the RFID chip and displayed to the driver by fading in the information into the image of the environmental section or providing the information at any other location in the vehicle interior.

The situation-based determination addressed in the preceding section can rival the determination of the environmental section addressed above, which provides for an orientation toward previous vehicle positions. Therefore, the weighting of various influencing variables can preferably be adapted by a vehicle occupant's operations when determining the environmental section. Particularly, it can be advantageous to define a threshold that a mathematical measure of the relevance of a traffic situation must exceed so that the environmental section is determined as a function of this traffic situation. If the threshold is not exceeded, the environmental section is adapted, as before, as a function of at least one previous position of the motor vehicle.

According to another advantageous improvement of the present invention, a change in the environmental section, which change is caused by a pitching or rolling movement of the motor vehicle, can be compensated by a reverse adaptation of the image section. For example, a rear-space view displayed is thus not falsified by a pitching movement of the vehicle when the brakes are pressed hard. A measurement or estimation of the disturbance variables to be compensated is helpful for the purpose of implementation.

Also the macroscopic course of the street traveled on by the motor vehicle can be compensated. In order for another vehicle traveling behind the subject motor vehicle to be contained in the environmental section, it is not sufficient to compensate the pitching and/or rolling movements of the motor vehicle in relation to a street surface approximated as a single flat surface. If the motor vehicle is initially traveling on a substantially flat street and then suddenly inclines strongly rearward for a brief period of time while ascending a locally narrow slope, then it is necessary to first compensate the inclination of the motor vehicle relative to the local street surface and secondly the inclination and height of this local street surface in relation to the plane in which the subsequent vehicle is located. Such data can be derived from electronic map data of a navigation system. Alternatively, if the motor vehicle has detection devices suited for this purpose, the absolute height and the absolute pitch angle of the motor vehicle in space can be determined. If additionally the previous position, to which the environmental section is to be adapted, is known in absolute terms in space, then the recording means and/or the image section can be adapted accordingly.

According to another advantageous improvement of the present invention, a change of the environmental section caused by a vibration of the motor vehicle can be compensated by a reverse adaptation of the image section. The image flow of a rear-area view can thus be stabilized electronically, for example, during travel over a cobbled pavement that causes the entire vehicle and thus also the recording device to vibrate. A measurement or estimation of the disturbance variables to be compensated is helpful for the purpose of implementation.

According to another preferred advantageous improvement of the present invention, the image section is compressed, at least intermittently, in at least one border area relative to a central image area in order to bring about a representation of the environmental section corresponding to a representation using a non-spherical mirror. The entire viewing angle can thus be enlarged without reducing or distorting the image in the central image area.

According to another advantageous improvement of the present invention, the device includes a device for determining the user's eye position and/or viewing direction, and the environmental section can be adapted as a function of this eye position and/or viewing direction. The driver is thus provided with the possibility of interacting with the device in the same manner, as he is accustomed to in the case of a conventional mirror. For example, a transition can be made to a wide-angled representation when the driver's gaze approaches the display unit. If appropriate, this effect can also be intensified more than proportionally. The driver is thus provided with the improved or added possibility as compared to the use of a conventional mirror, of interacting with the device. Nevertheless, due to the similarity in possibilities for interaction, this function of the device is intuitive for most drivers and can be used specifically without necessitating any noteworthy adjustment period on the driver's part. However, it can be advantageous to increase the zoom factor when the driver's gaze approaches the display unit. This can also meet the expectations of many users and is thus intuitive for such users and can be used specifically without necessitating any noteworthy adjustment period on the driver's part. Instead of the eye position, the head position of the user, particularly the driver, can also be detected if it is easier to do so in terms of technology.

According to another advantageous improvement of the present invention, the device includes a device for illuminating the vehicle environment, and the illumination of the vehicle environment is controlled as a function of the environmental section currently displayed. Thus, directed light sources and their orientation toward the environmental section can be used to specifically illuminate that part of the vehicle environment at all times that is actually restored in the display to the driver. Naturally, this goal can also be achieved if the illumination of the vehicle environment is controlled in such a way as a function of the at least one previous position of the motor vehicle that the environmental section currently displayed is illuminated in a defined manner, for example, as brightly as possible.

The headlights (particularly low-beam lights, high-beam lights and/or back-up lights) that are provided anyway in the motor vehicle can be used for the illumination if their light can be oriented and/or redistributed. Particularly in this case and in other cases of the use of visible light, the change of the illumination of the vehicle environment can contribute toward enabling the environmental section to be better represented as suggested by the invention and enabling the driver and other road users to have a better view of said environmental section.

The illumination of the vehicle environment can also be carried out in infrared spectrum if the recording means used according to the invention operate in the infrared spectrum. In this case, the changed illumination of the environment does not irritate other road users.

The idea of the invention can basically be applied to all devices used for monitoring the environment of a motor vehicle that provide the driver with an image representation of a section of the vehicle environment and are technically suitable for implementing the features of the invention. Devices that can provide the driver with an image representation of the section of the vehicle environment may be subsumed under the term "imaging devices." Imaging devices in this sense include both devices based on camera images (also infrared) and those that are based on synthetic images (optionally also with a symbolically represented vehicle environment), and images generated, for example, by scanning the environment with the aid of a radar device, a LIDAR device or similar detecting means. An object in the environment of a motor vehicle can also be recognized if it has an RFID chip or a similar detectable feature. Such an object detected with the help of an RFID chip could be plotted, for example, in an environmental image generated synthetically using a radar device. The term "recording of an image flow by recording device" used above also includes such cases of real-time image generation based on a detection of the environment. An imaging device in the above sense can also consist of several cameras and/or other sensors whose images are joined together to form a single image.

The display control unit can be formed, for example, as a motor-vehicle control unit. When designed appropriately, it can also perform, apart from the tasks cited above, additional tasks that may and/or may not be associated with the present invention.

Preferred exemplary embodiments of the invention will be described below with reference to the accompanying drawings. Additional details, preferred embodiments and improvements of the invention will become apparent therefrom. The exemplary embodiments, design forms and improvements described are applicable and advantageous both individually and in any combination with each other, unless otherwise specified and/or excluded technically. Some exemplary embodiments, particularly those relating to the determination of the environmental section, are also applicable independently of the invention.

DETAILED DESCRIPTION OF THE DRAWINGS

Figure 2:
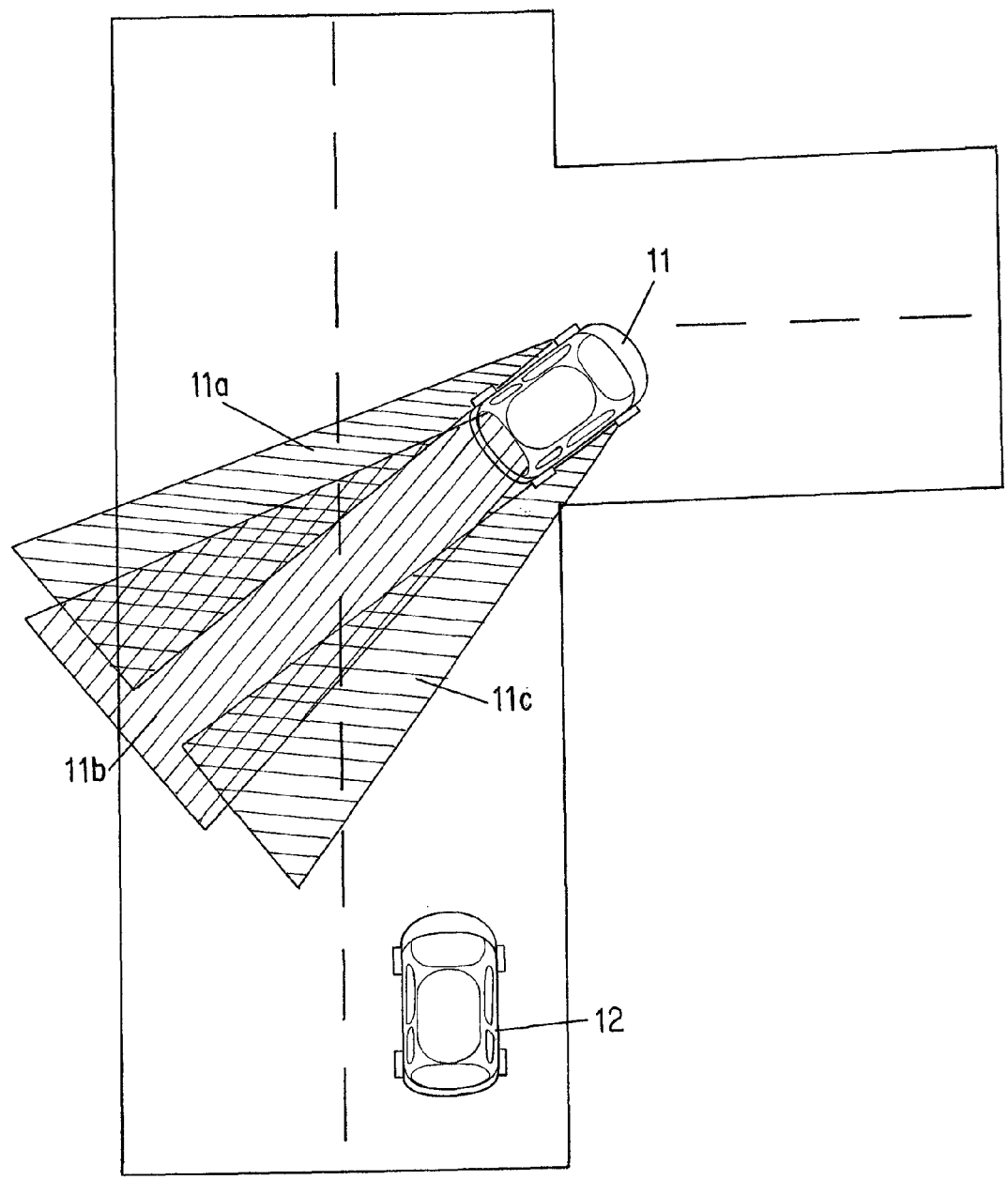
FIG. 2 shows a second traffic situation, in which a conventional mirror device does not allow sufficient monitoring of the vehicle environment.

Conventional rear-view mirrors of a motor vehicle enable a good view of a defined section of the vehicle environment that is determined by way of a constant aperture angle and a direction that is adjustable (by adjusting the mirror) relative to the motor vehicle. FIG. 2 shows the typical "viewing angle sections" 11a, 11b, 11c provided to the driver of a motor vehicle 11 by conventional rear-view mirrors.

The typical mounting location of the mirror in the front area of the motor vehicle does not allow a view of objects, particularly other motor vehicles present behind a curve in relation to the installation position of the mirror. For example, the view of a subsequent vehicle 2 is hidden from the driver of a vehicle 1 in FIG. 1 by the obstacle 3. The viewing angle sections 1b and 1c are indeed provided to the driver in their entirety. However, the "viewing angle section" 1a is cropped by the obstacle 3. This circumstance increases the risk of accident when driving around a curve, moving out of parking lots (particularly out of a transverse parking spaces) and similar other situations. Also in other situations, particularly in the case of acute-angled turns such as at an intersection, and turning maneuvers, that section of the vehicle environment that is visible in the mirror is only of limited use to the driver with respect to its direction. For example, the driver of the vehicle 11 in FIG. 2 also does not see the subsequent vehicle 12 since the viewing angle sections 11a, 11b, 11c of his rear-view mirror also turn in space together with the vehicle 11 making the turn.

For eliminating such problems, it is known from the prior art to use imaging devices such as cameras and to display, in the vehicle interior, at least sections of those images of the vehicle environment that are recorded using such devices.

In order to cover a large potentially relevant area of the vehicle environment, the imaging devices known from the prior art usually have very wide-angled dimensions. A wide-angled imaging device having a large aperture angle for covering a large potentially relevant area of the vehicle environment also suffers from considerable shortcomings. Firstly, an immediately reproduced wide-angled image complicates the orientation due to an unnatural perspective and necessitates a large display screen surface so that objects are represented in a size sufficient to make details visible. Secondly, the distance of the vehicle from other objects, particularly movable ones, often cannot be estimated correctly based on a wide-angled image. Approaching objects that are initially far off are displayed in a very small size for a long time in the course of the approximation and subsequently in a surprisingly rapidly increasing size for the driver. Furthermore, the border areas of a street represented in the image often become blurred in the case of fast travel and a wide-angled representation.

Among other things, due to the facts that the display surfaces available and provided in the vehicle interior are typically designed with very narrow dimensions and that the number of the driver assistance functions necessitating an image reproduction for the driver is constantly on the rise, it has already been suggested in the prior art to represent only an image section of an image flow containing images of at least one part of the environment of the motor vehicle with the aid of a display unit in the vehicle interior. Furthermore, the approach of providing devices for automatically modifying the environmental section represented by the display unit is known.

In contrast, the problem of optimally determining the environmental section represented by the display unit has not yet been solved effectively. A method according to an embodiment of the invention solves this problem. In the example described here, the method is formed such that the environmental section displayed is substantially oriented toward the road section last traveled on by the motor vehicle. This device thus possesses the exact ability that a conventional rear-view mirror lacks in certain situations described above (e.g., in the case of acute-angled turns). The road safety and comfort of the driver of the motor vehicle are increased since the driver can keep track of a subsequent vehicle in such situations as well.

The display control underlying the present example and other exemplary embodiments will be described in detail below.

The imaging device for determining the environmental section is not simply aligned mechanically for purposes of display control, but a section is adaptively extracted from an image or image flow recorded at a wide angle solely during the signal processing following the actual image capture. To a certain extent, a purely virtual camera pan is carried out when the selected image section is shifted in the image or image flow recorded at a wide angle. Furthermore, a virtual or digital zoom is optionally carried out when the image section extracted from the image or image stream recorded at a wide angle is selected to be larger or smaller. Depending on the embodiment of the device used, the wide-angled image and also the extracted image section can also be obtained by switching or mixing the images of several imaging devices among each other.

The device described in the present exemplary embodiment is designed such that the represented field of view of the imaging device; that is to say, the image section, is selected as a function of the vehicle coordinates at at least one previous point in time. This is of great advantage particularly when the vehicle is performing a complex driving maneuver. For example, if the motor vehicle weaves through traffic following a sudden evasive maneuver, a very unsteady surrounding view "moving back and forth" would be provided to the driver in a conventional rear-view mirror of the motor vehicle. An attempt of the driver to orient himself in such a situation with the aid of the image in the rear-view mirror could even result in disorientation. Instead, the environmental section to be represented by the display unit in the present example is determined such that several (precisely four in the present example) exactly defined previous vehicle positions are contained in the image displayed. For example, these can be vehicle positions trailing by 5, 10, 15 and 20 meters of genuine driving route on the trajectory of the vehicle in relation to the current position. For determining these vehicle positions that should/must be contained in the environmental section displayed, the current vehicle position can be determined continuously with the aid of a satellite-based system for determining positions (GPS, Galileo, etc.), and the position values at least of the last 20 meters of driving route are stored in a short-term memory. Particularly, wheel sensors of the vehicle can be used for detecting the driven route.

Figure 3:
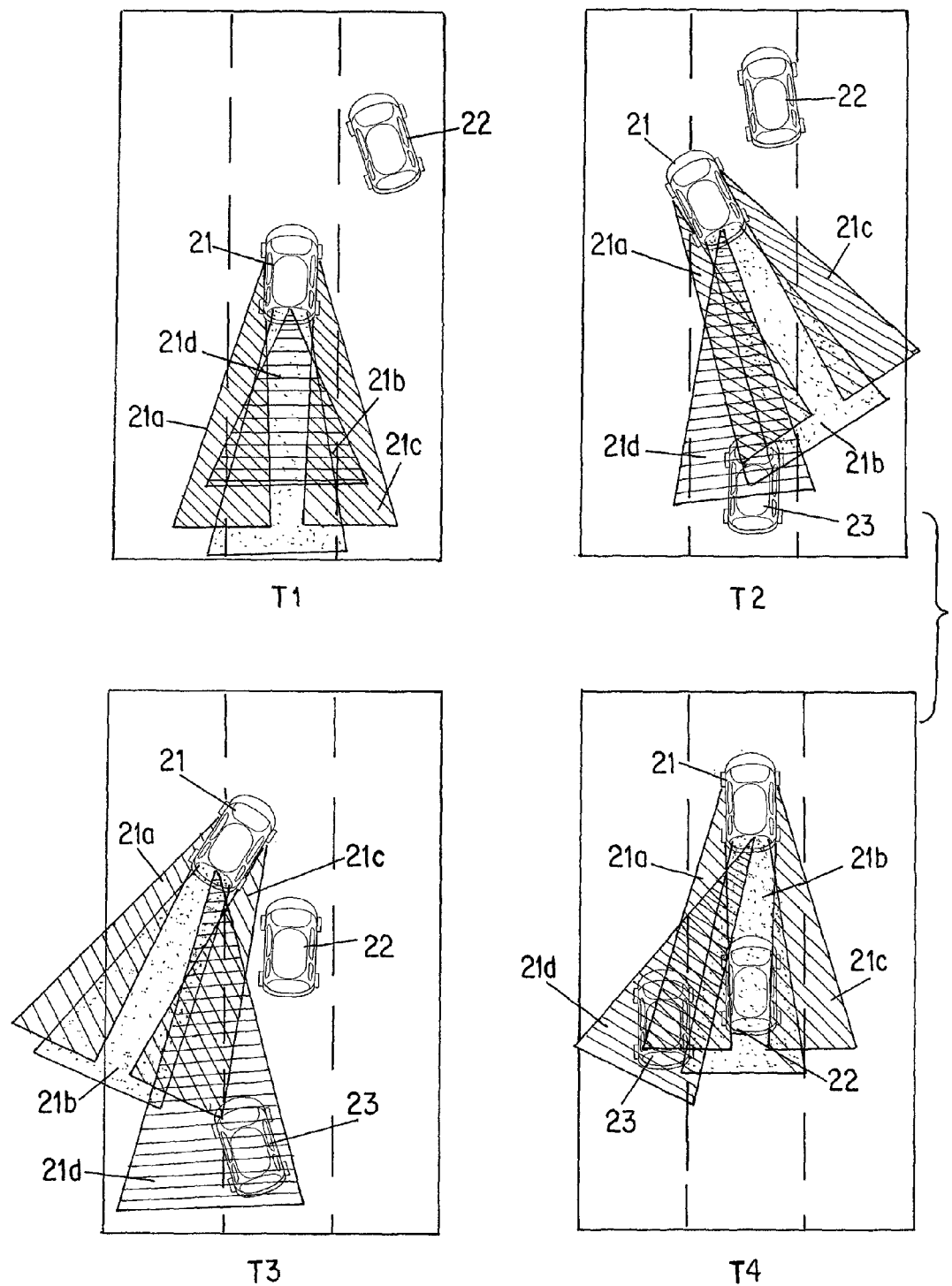
FIG. 3 shows a sequence of several snapshots during an overtaking process of a motor vehicle equipped with a display control unit.

FIG. 3 illustrates, based on a sequence of snapshots at the points in time T1, T2, T3 and T4, that a motor vehicle 21 evading a vehicle 22 that surprisingly changes lane can in this way keep track (viewing angle section 21d) of a subsequent vehicle 23 during this evasive maneuver. In contrast, in the use of conventional rear-view mirrors (viewing angle sections 21a, 21b, 21c), the subsequent vehicle 23 would disappear from the view of the driver. Particularly at the points in time T2, T3 and T4, the viewing angle section 21d determined based on the former vehicle positions clearly deviates from the viewing angle sections 21a, 21b, 21c of conventional rear-view mirrors particularly in terms of its orientation relative to the vehicle.

Figure 1:
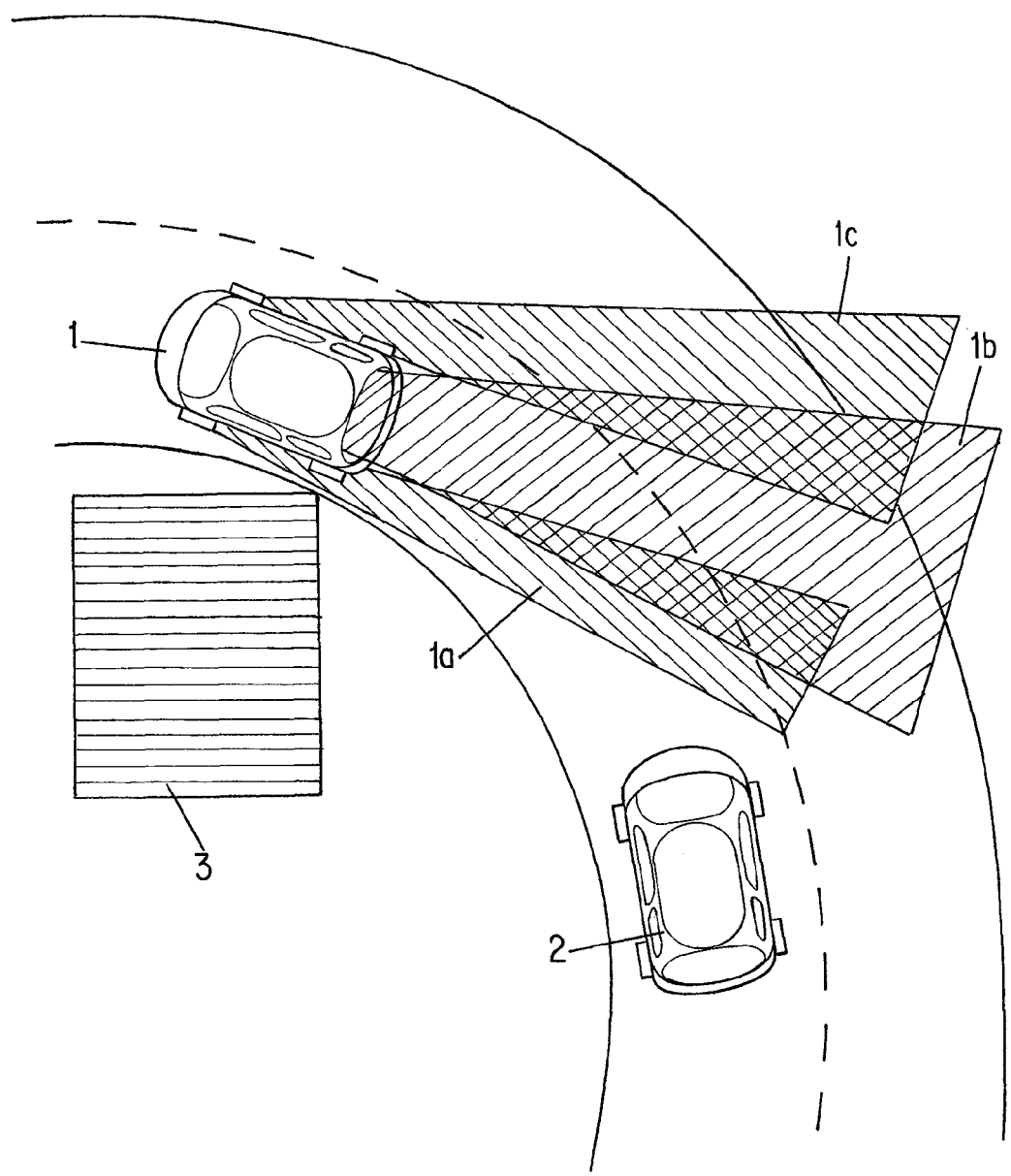
FIG. 1 shows a first traffic situation, in which a conventional mirror device does not allow sufficient monitoring of the vehicle environment.
Figure 4:
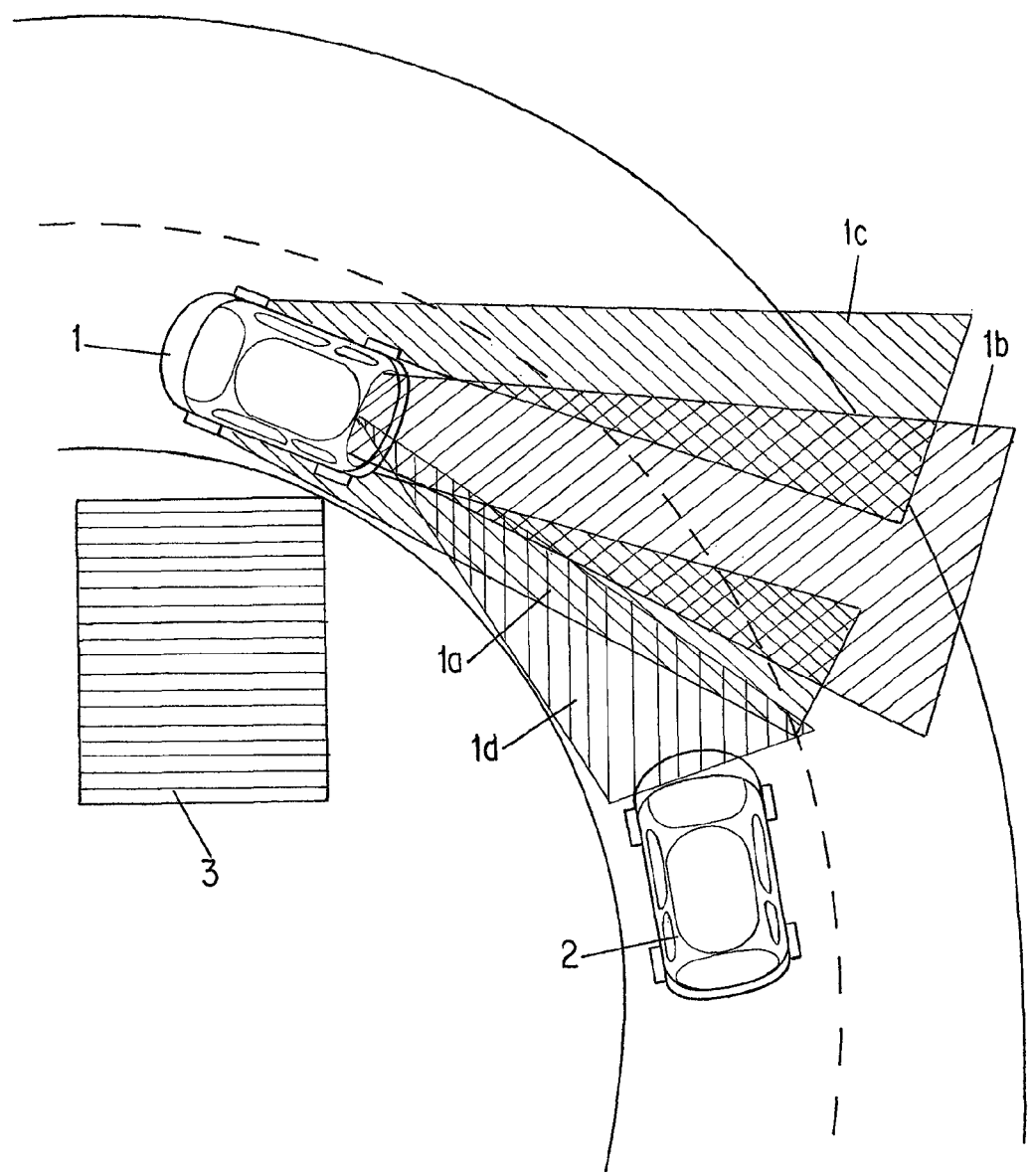
FIG. 4 shows a traffic situation corresponding to the one from FIG. 1 with the use of an intelligent display control.

FIG. 4 shows the traffic situation from FIG. 1 with the additional use of such a device. The viewing angle section 1d adapted by the device allows the driver of the motor vehicle 1 to keep track of the subsequent vehicle 2.

Figure 5:
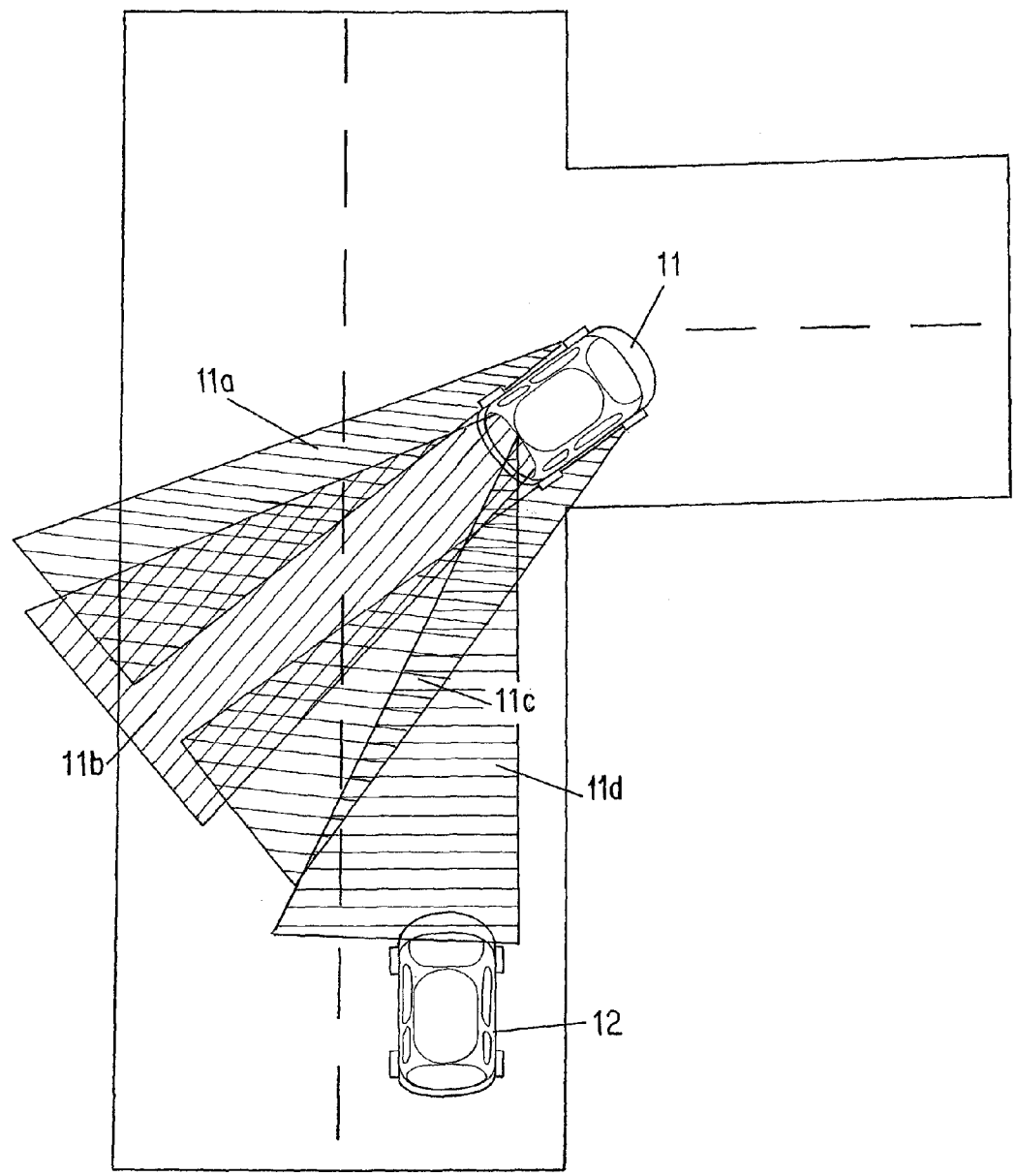
FIG. 5 shows a traffic situation corresponding to the one from FIG. 2 with the use of an intelligent display control.

FIG. 5 shows the traffic situation from FIG. 2 with the additional use of such a device. The viewing angle section 11d adapted by the device allows the driver of the motor vehicle 11 to keep track of the subsequent vehicle 12.

The device described in the present exemplary embodiment is designed such that the environmental section displayed is determined particularly with the aid of the azimuth direction angle between the vehicle longitudinal axis (otherwise any other reference axis permanently integrated in the vehicle is usable) and the previous vehicle positions.

For this purpose, the motor vehicle in the present exemplary embodiment includes a device for determining the orientation of the vehicle. This orientation is preferably determined continuously just as the vehicle position and stored in a short-term memory—preferably the same short-term memory in which the position values are also stored. It is particularly advantageous to assign the alignment values to the respective position values as early as during storage in the short-term memory. Otherwise, the alignment values can also be assigned to the position values subsequently, for example, with the aid of the same or similar time stamps.

The determination with the aid of the direction values is effected here by use of an interpolation formula between the angular values of the individual previous vehicle positions. In doing so, the respective latest values are weighted more heavily than the respective older values that are nonetheless taken into consideration.

In another exemplary embodiment of a method for display control, instead of rigidly determining the previous vehicle positions as those positions that trail by 5, 10, 15 and 20 meters of genuine driving route on the trajectory of the vehicle relative to the current position, it is possible to define that portion of the previous trajectory as a function of the current speed of the vehicle. It is possible, for example, to take into account the last 50 meters of driven route in the case of fast travel, while only the last 10 meters of driven route are taken into account in the case of slower travel.

In the present exemplary embodiment, the aperture angle is basically selected to be only large enough to allow all the previous vehicle positions taken into consideration to be displayed in the environmental section. Thus, it is basically kept as small as possible. In exceptional cases, an additional aperture angle can be selected for taking into account additional environmental areas worthy of display. If the previous vehicle positions taken into account are substantially located on a straight line, for example, in the case of straight-ahead travel, a lower limit of 15 degrees is further provided for the aperture angle in the present exemplary embodiment.

Likewise, an upper limit can be determined that prevents details of the environment from being represented in too small a size. Then, possibly not all previous vehicle positions considered are actually displayed; however, the environmental section is determined such that the previous vehicle positions taken into account are covered to the "best extent possible."

In another exemplary embodiment of a method for display control, the aperture angle is also not changed abruptly, but instead on a sliding basis with the use of an interpolation formula. The interpolation formula used can substantially correspond to that cited above for calculating the azimuth direction angle.

It should be pointed out that a navigation system including an electronic roadmap is not strictly required for determining the environmental section with the help of the azimuth direction angle relative to previous vehicle positions. This enables very easy implementation of the invention in less-equipped vehicles as well. For example, a mere positioning system that is usually more reasonably priced than a navigation system, and the data from the odometer of the motor vehicle (speed, distance driven from wheel sensors) that are usually available anyway are also enough for controlling the screen selection.

Furthermore, if the steering angle of the vehicle is evaluated, then even a system for absolute positioning is rendered unnecessary. Entirely with the help of data from the odometer, inferences can then be drawn on the azimuth direction angles of the previous vehicle positions relative to the current vehicle orientation and on the distances of the previous vehicle positions relative to the current vehicle position.

In another exemplary embodiment of a method for display control, the aperture angle can be determined as a function of the vehicle speed. In that case, a variably selected environmental section, the size of which (size of the environmental area covered) depends on the vehicle speed, is displayed to the driver. The optimum aperture angle for the observation and interpretation of the environment by the driver is variable at varying speeds. As a result of the speed-dependent determination, a relatively wide-angled overall view supplementing the conventional mirror image can then be displayed to the driver at a low speed (e.g., shunting speed). In contrast, at a high speed (e.g., triple-digit speeds), the aperture angle is automatically limited. The enlargement of far-off objects is thus increased. This function can be implemented purely electronically (without optical zoom).

Furthermore, instead of a direct change of the aperture angle as a function of the travel speed, only an upper or lower limit for the aperture angle can also be changed as a function of the travel speed. As mentioned above, a lower limit for the aperture angle is provided in the present exemplary embodiment. An upper limit is likewise provided. This upper limit should also not be exceeded if all previous vehicle positions to be taken into account were coverable only by use of a larger aperture angle. In the case of a restriction due to the upper limit, the previous vehicle positions are covered to the "best extent possible" with the use of a quality criterion. Both these upper and lower limits cited above are determined as a function of the travel speed in the present exemplary embodiment. This assists in displaying that most significant spatial angle in the current traffic situation, the size of which (again, the size of the environmental area covered) cannot be represented in too large a size particularly due to the typically limited display surface available. As a result of providing an upper limit of the aperture angle that reduces with increasing speed, a subsequent motor vehicle is not represented in too small a size when the vehicle is traveling fast. This also applies when the vehicle is traveling fast on a winding road and the previous vehicle positions thus scattered in different directions would "actually" necessitate a larger aperture angle in order to be covered.

The aperture angle can also be changed as a result of the driver's operations, if appropriate.

In another exemplary embodiment of a method for display control, the selected environmental section can be represented as a function of the steering angle of the vehicle at least one point in time. The evaluation of a history of the steering angle, for example, across the last 20 meters traveled, is particularly advantageous. From this evaluation, optionally together with the travel speed and data of the wheel sensors, previous vehicle positions can be determined easily relative to the current vehicle position. An actually explicit determination and evaluation of such previous vehicle positions is not strictly necessary in order to achieve an advantageous adaptation of the environmental section. Even a simplified system directly taking into account the steering angle, for example, based on a characteristic map together with the travel speed and data of the wheel sensors, can achieve one of the essential advantages intended by the display control, in the case of a suitably determined characteristic map, namely, the determination of the environmental section such that those road areas that were last traveled on, can be seen.

For example, the advantages, shown in FIGS. 4 and 5, of the display control can also be achieved using such simple means exclusively taking into account the steering angle. For example, if the steering wheel is turned to the left, then that section of the environment that is located rearward to the left relative to the vehicle, when viewed in the travel direction, is displayed. As a result of this simple instruction, the driver is provided—in the case of a suitable gain factor between the steering angle and the azimuth direction angle—with a display of an environmental section that is oriented toward those road areas behind the vehicle that were last traveled on, also in the case of a travel through a circular or arcuate curve. In order to achieve this for more complex, non-circular or non-arcuate curves as well, a history of the steering angle values can be recorded and evaluated.

In another exemplary embodiment of a method for display control, the environmental section represented by the display unit is determined as a function of previous knowledge of the vehicle environment. The previous knowledge can particularly relate to facts and objects that cannot or are not detected by the vehicle itself. Information derived with the aid of an electronic roadmap and/or a satellite image can be used for the determination, for example. This exemplary embodiment relates particularly to vehicles having a navigation system. For example, information that is derived from an electronic map and relates to the type of a traffic junction and/or the course of the street currently traveled on can be used for advantageously determining the environmental section displayed. This entails major advantages particularly in the case of complex traffic junctions having frequent changes of direction. Thus, the optimum behavior of the system can be adjusted automatically, for example, depending on whether the vehicle is located at a traffic circle or shortly before a tunnel entrance.

According to another example, when a skidding of the vehicle is detected, the environmental section can be oriented constantly along the road previously traveled on with a compensation of the turning of the vehicle due to the skidding. The required continuous determination of the orientation of the vehicle relative to the course of the street can be carried out based on the navigation system. Also previous knowledge of the presence of larger objects that could obstruct the view in a defined direction relevant to traffic and the position of the motor vehicle relative to these objects can be taken into account in determining the environmental section. The environmental section can then be determined such that instead of attempting, "in vain," to display hidden environmental areas, those portions of the environment are better represented that are not hidden. For example, previous knowledge of the presence of residential blocks or tunnels in the environment of the vehicle can be used. Such previous knowledge is already accessible based on navigation charts currently available on the market. Furthermore, satellite maps provided, for example, by Internet service providers can be evaluated in order to practically carry out or at least control the automatic determination of the environmental section.

Previous knowledge of the type mentioned above can be used firstly to cover previous vehicle positions to an improved extent since conclusions can be drawn, from the previous knowledge, on the course of the street and thus the most probable previous vehicle positions. Previous knowledge about the environment of the vehicle and/or current additional information can also be used in order to deviate, depending on the situation, from a coverage of previous vehicle positions, for example, in order to represent an environmental section that could pose or that actually poses a hazard.

An additional exemplary embodiment of a method for display control is aimed at the last-mentioned cases, in particular. The adaptation of the environmental section displayed can be optimized, as a function of a predicted trajectory of the vehicle and/or its kinematic parameters, to a position to be expected in the near future. The azimuth direction angle that will be relevant at a defined point in time in the near future is then calculated to some extent. The related advantage is firstly that the mode of operation of the system can be accelerated particularly if a change of direction of the imaging device—the virtual pan addressed above—requires a relatively long time. Particularly in the use of a radar system as a recording device within the meaning of the invention, it can be advantageous to compensate in this way, at least partly, for a defined dead time or time constant for such a pan. Secondly, the driver himself typically requires a defined amount of time for interpreting the content of an image or image flow. The driver can thus be assisted in making a quicker response in certain situations in that the environmental section that will be of relevance to the driver in the next moment is already displayed at the current point in time. This variant of implementing the present invention is of great advantage particularly for the second reason mentioned above when it is known, for example, from data of a vehicle-to-vehicle communication that a defined event will occur or become visible at a future point in time.

In an additional embodiment, that can be effectively combined with the one last described, of a method for display control, the environmental section represented is oriented toward one or more directions from which other road users approach or could approach the vehicle. Such directions can be determined particularly with the aid of previous knowledge of the vehicle environment, for example, from an electronic roadmap or a satellite map. The relevant directions (in the coordinate system of a map) can also be determined at defined locations based on accident statistics possibly contained in the electronic maps. If, for example, a certain traffic junction or a certain curve is known to have a clearly increased accident rate, special solutions can be activated with the aid of an appropriately improved method based on the navigation chart. Furthermore, it is possible to take into account occurrences such as the subject vehicle stalling in an unfavorable traffic situation. Moreover, the presence or approach of other road users and/or the presence of traffic signs detected based on the environment sensor system and/or wireless communication technology (radio-based car-to-car communication and/or RFID) can be taken into account. The latter can also be detected by the motor vehicle—if the motor vehicle and the infrastructure have the appropriate technical equipment—and so can intersections and side roads not only on the basis of map data and environment sensor systems, but also on the basis of wireless communication technology (RFID, in particular).

Figure 6:
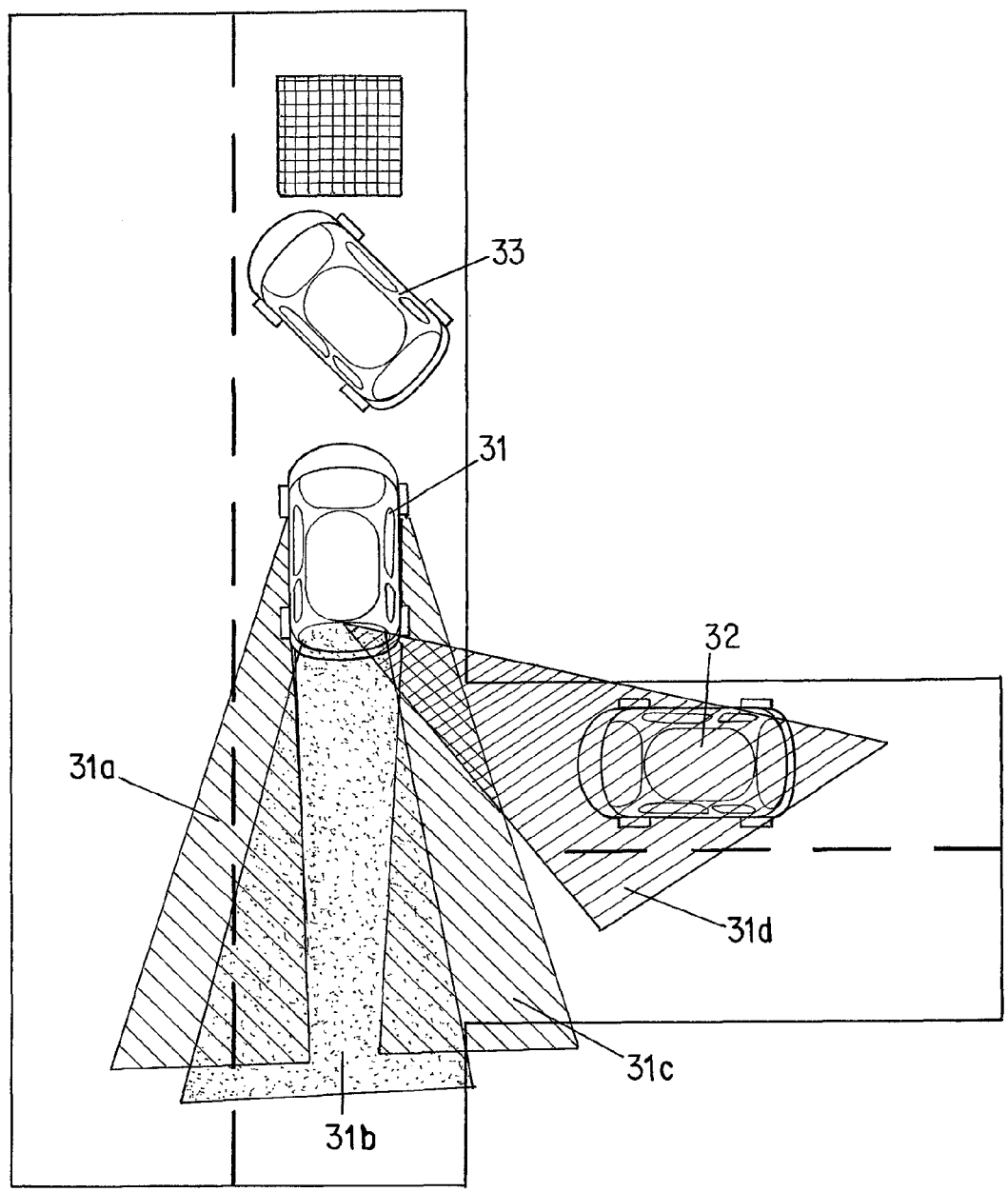
FIG. 6 shows a third traffic situation with the use of an intelligent display control.

FIG. 6 shows such a situation. The vehicle 33 has blocked the onward travel of the vehicle 31. The environmental section represented to the driver of vehicle 31 by the display unit of vehicle 31 is determined such that the viewing angle section 31d is oriented in a direction from which other road users, here the vehicle 32, approach or could approach the vehicle 31. In contrast, the vehicle 32 is not contained in the viewing angle sections 31a, 31b, 31c of the conventional rear-view mirror of the vehicle 31. Such a variant of display control that comes into action depending on the situation can be implemented in practice, for example, by continuously classifying the current traffic situation and determining the response of a display control unit possibly present in a vehicle, which response is relevant to a defined situation class, with the help of response data of a navigation system comprising a satellite-based global positioning system and a corresponding electronic roadmap containing response data, and optionally with the help of the vehicle speed. The response data of the navigation system would have to provide, in the case of FIG. 6, for example, a monitoring of the side street which is merging on the right side and on which the vehicle 32 is approaching in the current situation.

In another exemplary embodiment of a method for display control, the environmental section displayed is determined or adapted based on a current analysis of the traffic situation in the vehicle environment. Particularly other road users and other moving objects in the vehicle environment can be better taken into account as obstacles and hazard sources if the environmental section in certain situations can be oriented to these other road users or objects. The driver's attention can thus be called to the environmental areas currently relevant to the traffic, in addition to his "normal" field of vision, and provided with a view the same. The speed of other road users relative to the subject vehicle can be used as the criterion for carrying out the determination based on results of such an environmental analysis. Such a variant of display control that comes into action depending on the situation can likewise result, in the situation of FIG. 6, in orienting the viewing angle section 31d in the direction from which the vehicle 32 approaches the vehicle 31. However, unlike the previous example, this is not due to a monitoring of the side-street as such, but instead due to a pan of the represented environmental section specifically in the direction of vehicle 32.

In another exemplary embodiment already suggested above of a method for display control, the environmental section displayed is determined with the aid of a wireless communication of the motor vehicle with at least one other road user. The communication can be carried out directly between the vehicles or by way of an infrastructure facility that can also transfer data of the networked vehicles in a prepared form. With the aid of such a method, the approach of another accordingly networked vehicle is both reported and optionally displayed to the driver automatically. For purposes of display, the display control unit can select the displayed environmental section such that the approaching vehicle is contained in the same. A satellite communication, traffic alerts communicated via radio, satellite images and/or other infrastructure facilities can be used as information sources in such a method. Alternately or additionally, environmental sensors of the motor vehicle can also detect the environment. With the aid of object recognition based on this, other road users moving relatively rapidly toward the trajectory of the subject vehicle can be detected and tracked; that is to say, they can be tracked by way of an adaptive determination of the environmental section displayed.

In the case of several directions or objects to which the driver's attention should be called, the display image represented to the driver can be electronically joined together from several relevant environmental sections.

In the case of a change of the direction of the environmental section to be displayed relative to the motor vehicle, the device can provide a sliding transition instead of an abrupt jump in that the environmental section displayed slides from the direction applicable so far toward the new direction. The result is a scrolling process that is continuous from the driver's point of view. The driver thus more easily maintains orientation relative to the information content of the display image.

As pointed out by the exemplary embodiments last described, the determination of the environmental section represented can depend on several factors. The device described herein basically serves for monitoring the road areas that were last traveled on. Exceptional cases may involve a specific deviation therefrom based on the situation, and the environmental section displayed can be determined differently, for example, based on another approaching vehicle. The described situation-based deviations from a monitoring of the last-traveled road areas by the device described here can be activated or initiated in the manner of an interrupt in the corresponding situation. The weighting of such factors when determining the environmental section represented can thus, according to predetermined activation rules, depend on the type of traffic situation. Alternately or additionally, it can also be regulated variably depending on the related adjustments made by the user.

For this purpose, the driver can be provided with an operating option of manual adjustment in order to vary the weightings assigned to the different influencing variables, with the aid of which the environmental section displayed can be determined. Predefined and/or weighting profiles, which can be changed by the driver, for different situations such as expressway, country roads or city with and without traffic jams can also be provided as predefined automatic adjustments.

Figure 7:
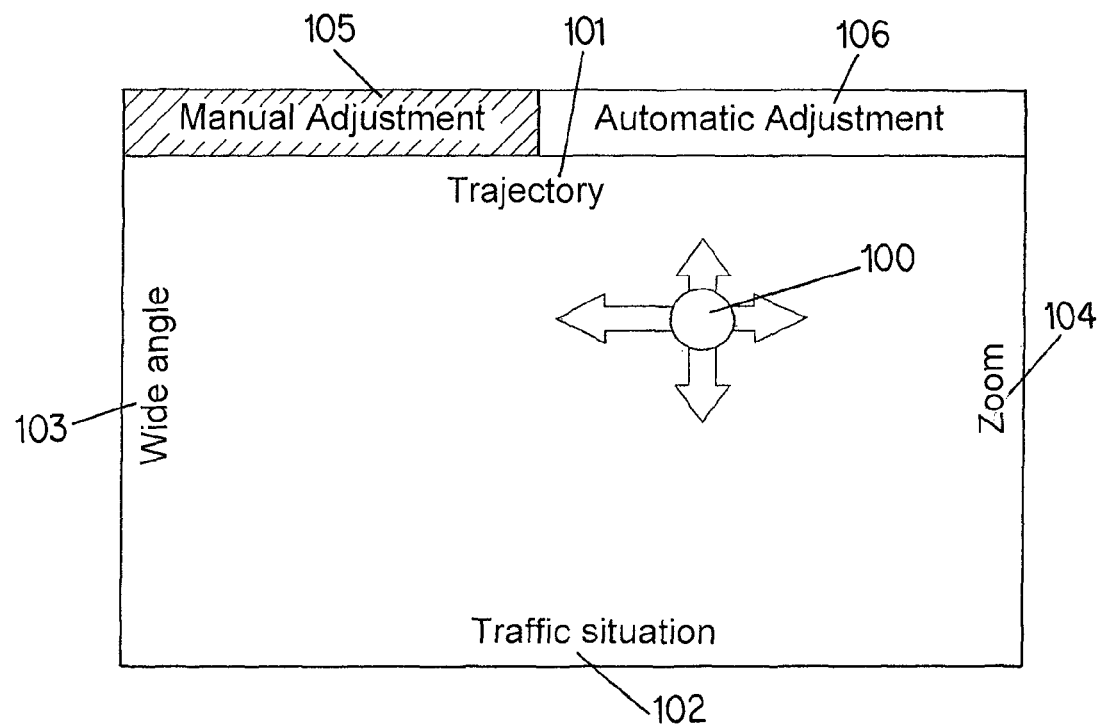
FIG. 7 shows a graphical display of a user interface for setting the parameters of a display control unit.

FIG. 7 shows a user interface, with the help of which the user can input commands into the device described here by way of corresponding adjustments. In the top line of FIG. 7, the basic options "Manual Adjustment" 105 or "Automatic Adjustment" 106 are offered in the manner of so-called tabs.

In the case of manual adjustment selected in the present case, the vertical position of a point 100 and thus the weighting of the competing determination-influences "Trajectory" 101 and "Traffic situation" 102 can be specified. The user can input his specifications via a touch-screen or by moving a rotary push-button switch. When the point 100 is moved downward, the device deviates, in a larger number of special traffic situations, from the main task of monitoring the road areas last traveled on by the motor vehicle. This takes place in a smaller number of special traffic situations when the point 100 is moved upward.

Likewise, the horizontal position of the point 100 and thus the weighting of the competing determining-influences "Wide angle" 103 and "Zoom" 104 can be specified. When the point 100 is moved to the left, the device tends to adjust a wide-angled perspective in the case of several directions relevant to the traffic in order to cover, as far as possible, all these directions in the environmental section represented. If the point 100 is moved further to the right, a single viewing direction, namely the viewing direction classified as the most critical or significant, is zoomed in.

Following the above examination of different variants of display control, the reproduction of the image section will now be discussed in detail. The image section is reproduced according to the invention such that in addition to a mere representation of the environmental section, at least one lot of optical information relating to the position of the environmental section relative to the motor vehicle is output to the driver.

According to a preferred exemplary embodiment of the invention, the representation of the environmental section by the display unit is accompanied by a symbolic representation indicating the position of the currently represented environmental section relative to the motor vehicle.

In the simplest case, the symbolic representation can be implemented by an image representation of the direction of the represented environmental section relative to the motor vehicle. This image representation can particularly contain an image representation of the vehicle itself. The image representation can also particularly show or point out the relation between a reference axis of the vehicle, for example, the vehicle longitudinal axis and the direction of viewing at the environmental section from the vehicle. For example, a bird's eye top view of the motor vehicle can be represented and the direction of viewing from the vehicle at the environmental section is represented by an arrow originating from the vehicle and/or an opening beam. The length of such an arrow or the width of such a beam can additionally represent the zoom factor.

Such an image representation or any other symbolic representation can particularly be generated behind a semi-transparent reflective layer of a vehicle rear-view mirror. The driver using the mirror in the conventional manner is instructed by this additional image representation in an ergonomic manner on the additional information provided to him by a display unit disposed sometimes at a completely different location in the vehicle interior. A fade-in of the image representation into the interior rear-view mirror of the vehicle is particularly advantageous.

The fade-in of the image representation into a rear-view mirror elegantly establishes a relationship between the use of conventional rear-view mirrors and the invention. Naturally, the device described here can be used independently as a purely additive supplement for conventional rear-view mirrors. A possible failure or malfunction of the electronic system used for implementing the invention usually cannot be regarded as being critical to safety. Even if a camera or a corresponding electronic control unit used according to the invention as the recording device fails, or even in the case of a local power outage, the conventional mirror view continues to be usable by the driver.

Figure 8:
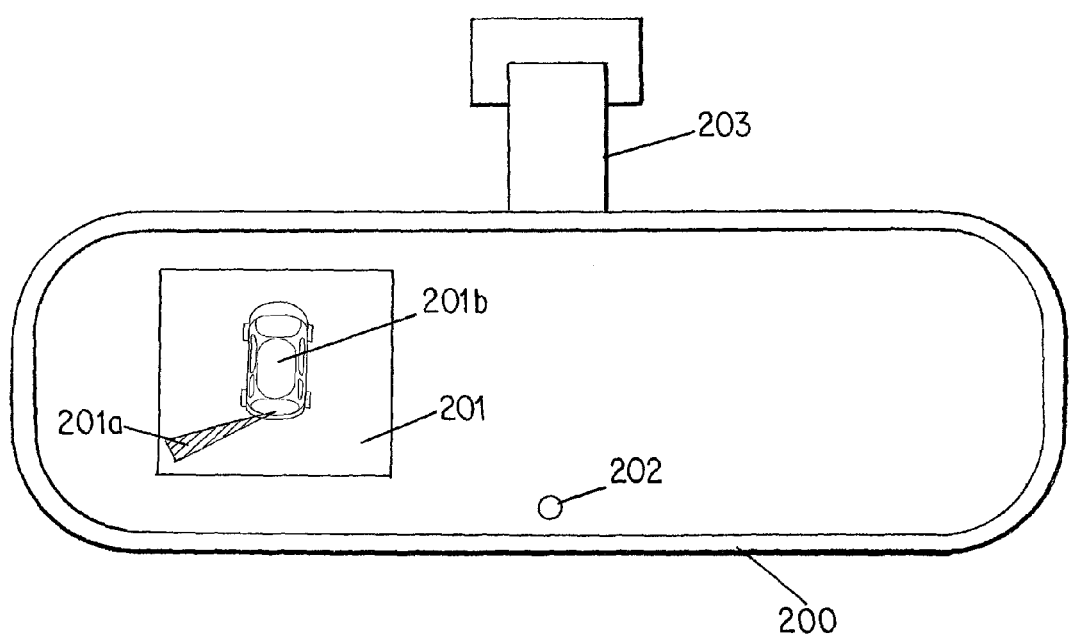
FIG. 8 shows one embodiment of an interior rear-view mirror with the possibility of displaying an image representation indicating the position of the currently represented environmental section relative to the motor vehicle.

FIG. 8 schematically shows a possible embodiment of an interior rear-view mirror 200 having a support 203 and a brightness sensor 202. The mirror offers the possibility of displaying an image representation (Field 201), which indicates the position of the currently represented environmental section relative to the motor vehicle. In the present case, this is implemented by a beam 201a by whose orientation relative to the reproduction 201b of the motor vehicle, the driver can orient himself. However, the environmental section itself is represented by a display unit disposed, for example, in the center console of the vehicle.

In addition to a symbolic representation indicating the position of the currently represented environmental section relative to the motor vehicle, the image section representing the environmental section can also be produced behind such a semi-transparent reflective layer of a vehicle interior rear-view mirror. The driver then need not change his viewing direction substantially in order to observe either the environmental section faded in into the reflecting surface or the actual mirror image. For better classification and interpretation, the additional image representation indicates to the driver the environmental section showing him the image section that is likewise faded-in.

In order to ensure the continued availability of the actual mirror image, the reflecting surface that is not used for representing the environmental section can preferably continue to be used as a mirror in the actual sense. Also in the case of a failure or malfunction of the display unit or the electronic system of the device described here, the rear-view mirror continues to be usable in the conventional sense.

Figure 9:
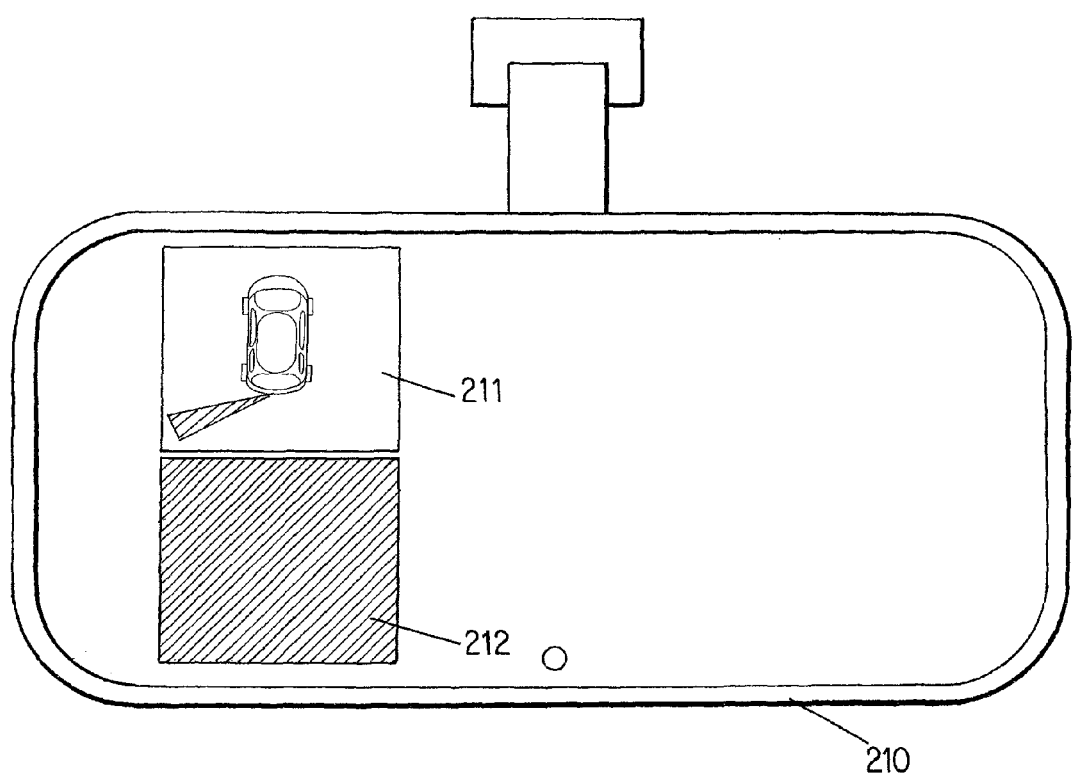
FIG. 9 shows an embodiment of an interior rear-view mirror with the possibility of displaying an image representation and an environmental section.

FIG. 9 schematically shows a possible embodiment of an interior rear-view mirror 210 offering the possibility of displaying an image representation indicating the position of the currently represented environmental section relative to the motor vehicle (Field 211) and an environmental section (Field 212). The field 211 can be implemented by means of a trans-illuminating display unit (such in as a taximeter), the field 212 by a TFT display. Both fields 211 and 212 can also be implemented by means of a common TFT display.

A design form where the arrangement of the environmental section within the reflecting surface is dependent on the position of the environmental section relative to the motor vehicle is particularly advantageous. A position of the environmental section to the right behind the motor vehicle can then be expressed, for example, by arranging the environmental section down on the right side within the reflecting surface. In order to enable this, a display unit larger than the display of the environmental section itself must be integrated in the rear-view mirror. It can even extend over the entire reflecting surface. For the continued availability of the actual mirror image in those parts of such a display unit that are not used for displaying the environmental section, the display surface not used for representing the environmental section can preferably be converted into a reflecting state unless it is required for displaying the environmental section. In the simplest case, this can be implemented in that a semi-transparent reflecting surface covers the display unit. The semi-transparent reflecting surface reflects; that is to say, it is converted into a reflecting state, in all areas that are not backlit by the display unit. The rear-view mirror continues to be usable in the conventional sense in the case of a malfunction of the display unit.

Figure 10:
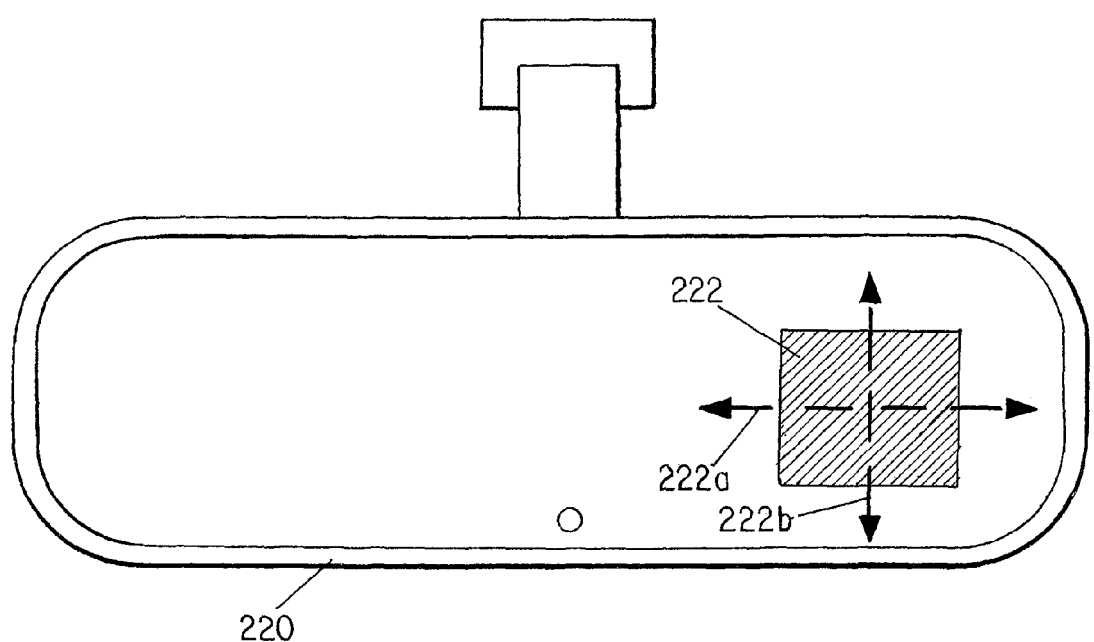
FIG. 10 shows an embodiment of an interior rear-view mirror with the possibility of displaying an environmental section at a location of the reflecting surface that corresponds to the position of the environmental section relative to the motor vehicle.

FIG. 10 schematically shows a possible embodiment of an interior rear-view mirror 220 with the option of displaying the environmental section (field 222) at a location on the reflecting surface that corresponds to the position of the environmental section relative to the motor vehicle. The arrows 222a and 222b displayed that are actually not visible to the driver point out, merely for purposes of explanation, the ability of the field 222 to be displaced within the reflecting surface. In such a design form, it is possible, but not necessary, to dispense with an additional image representation indicating the position of the currently represented environmental section relative to the motor vehicle (comparable to field 211 from FIG. 9).

Additional exemplary embodiments of the invention, which likewise provide a representation of the environmental section as a function of the position of the environmental section relative to the motor vehicle and/or a representation of the environmental section accompanied by a symbolic representation of the position of the environmental section relative to the motor vehicle, relate to a head-up display of the motor vehicle. The fade-in of information with the help of a head-up display can be considered as being particularly advantageous since the driver need not avert his eyes from the driving process in order to observe and interpret the information.

By means of a multicolor head-up display of the motor vehicle, the image section representing the environmental section can be represented without substantial additional preparation. In contrast, with the help of a monochrome head-up display, the image section representing the environmental section can be represented by converting the image section into a bitmap graphic, for example. In doing so, the frequency of the bright pixels in an image area can correspond to the brightness of the image area (dithering). If different grayscales can be represented, the image section can also be converted into a corresponding gray-level image.

Also in the representation by means of a head-up display, the position of the image section representing the environmental section in relation to the stationary parts of the vehicle can be determined depending on the position of the environmental section relative to the motor vehicle. The image section can move corresponding to this position, for example, within a defined frame on the entire display surface of the head-up display or also within the entire display surface of the head-up display. The remaining display surface remains available for other purposes. It can be used either for other displays or remain fully transparent in order to enable the driver an unobstructed view of the driving process.

Also a user interface for changing adjustments, as shown in FIG. 7, can be represented in the head-up display. Likewise, only the current adjustments can also be represented in a detailed or simply symbolic form in the head-up display. Particularly the latter can naturally take place at the same time as the representation of the image section itself. The driver can then constantly ascertain by himself, with the help of the head-up display, the criteria as per which the represented environmental section is or was selected.

Figure 11:
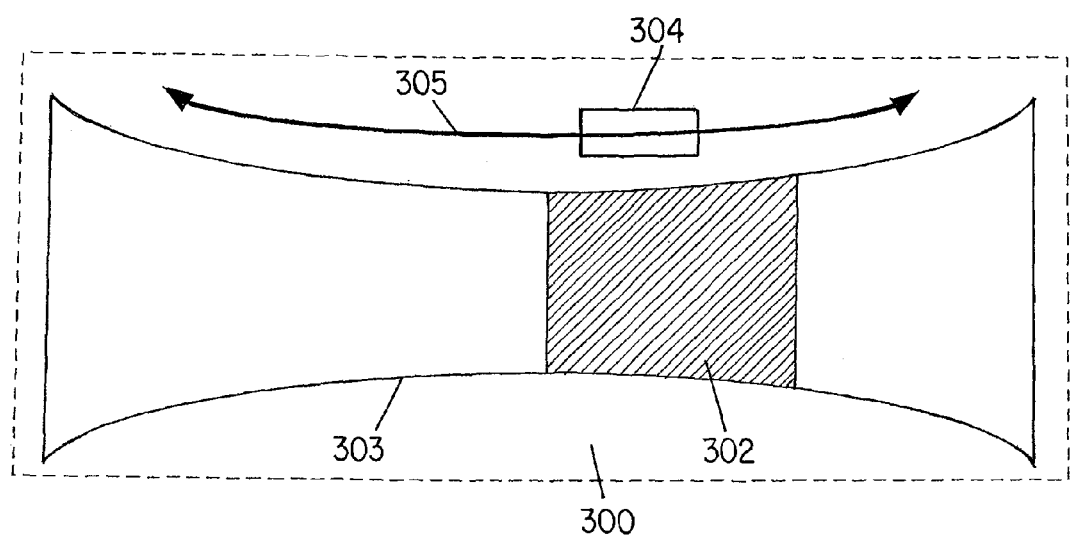
FIG. 11 shows a possible embodiment of a display including an image section which is transformed corresponding to the position of the environmental section relative to the motor vehicle.

In addition to a variation in the position of the image section in the head-up display depending on the position of the environmental section relative to the motor vehicle, the image section can also be subjected to a geometric transformation indicating the represented spatial or angle area. Particularly, such a geometric transformation can be configured in such a way that it creates a spatial impression by means of its curvature, shadow formation, etc. FIG. 11 shows an image section 302 transformed accordingly. Advantageously, a spatial impression is thus also created without an actual use of 3D technology for stereoscopic representation.

The image section 302 from FIG. 11 can further be shifted, corresponding to the ability of the image section 222 from FIG. 10 to shift, within the display surface 300 of the head-up display. A frame 303, along which the image section slides during the shift, can be provided as a frame for carrying out this shift to a certain extent. The shape of the frame 303 and the distortion of the image section 302 together show the possibility of a rotatory pan around the motor vehicle to which the environmental section represented can be subjected. Also the position of the image section 302 within the frame 303 gives the driver information on the position of the displayed environmental section relative to the motor vehicle. Said distortion further facilitates the interpretation.

Alternately or additionally (in the case of FIG. 11, additionally), for further illustration, a symbolic reproduction 304 of the image section 302 can be represented which is shifted along a guide 305. This simplified symbolic form of representation can also be used independently which corresponds approximately to the information content of the exemplary embodiment shown in FIG. 8 for a fade-in into an interior rear-view mirror.

In the same or similar way, several image sections, each of which shows an environmental section, can also be represented simultaneously in the display surface. The several environmental sections need not be joined together or adjoining each other; the same applies to the image sections. The arrangement and, optionally, distortion of each of the environmental sections within the display surface is preferably selected corresponding to the position of the respective environmental section relative to the motor vehicle. In the case of an adaptation of the environmental sections, the image sections "move" accordingly within the display surface.

According to another exemplary embodiment of the invention, a stereoscopic display is used in order to represent the image section in the view of the vehicle driver in a virtual plane which indicates, by means of its orientation and/or curvature, the position of the environmental section represented in the image section relative to the motor vehicle. In the case of an adaptation of the environmental section, this virtual plane is preferably further rotated or curved in step with the adaptation. If permitted by the display technology used, the virtual space, in which the virtual plane is oriented or curved, can be curved randomly—for example, semispherically into the mirror plane or the windshield plane (in the case of a head-up display). In order to implement such an embodiment of the invention together with a fade-in of the image section representing the environmental section into a rear-view mirror, a stereoscopic TFT display can be used. Such displays that allow a stereoscopic perception without having to wear unwieldy aids such as shutter glasses or a head-mount display are now available on the market and can be accommodated behind a partly transparent reflecting surface of the rear-view mirror, as described above for conventional displays.

According to a preferred embodiment of the present invention, a deflection of the imaging device used as the recording device, due to interference, from its required position, which can be calculated in terms of height and angle, is compensated by a dynamic selection of the image section counteracting the interference. Such a deflection due to interference can be caused, for example, by a pitching and/or rolling movement of the vehicle. The former can, in turn, result particularly from a change in the road ascent and the latter from a rapid cornering. Defined signals such as signals of chassis stabilization, air suspension, etc. that are available anyway in the vehicle can be used as measured variables toward which the compensation is oriented. As a result of the compensation, the environmental section to be displayed is also represented correctly during a change in the road ascent or rapid cornering.

Such a deflection due to interference can also be caused, for example, by a travel-induced vibration of the imaging device. Thus, according to an alternately or additionally applicable preferred embodiment of the present invention, a travel-induced vibration of the imaging device from its calculated required position is compensated by means of a dynamic selection of the field of vision represented. On-board sensor systems for detecting the vibration, load, etc. can also be used for controlling or regulating the corresponding image stabilizer unit. Here there exists a clear difference from image stabilizers known from technology used in camcorders, for example.

Figure 12:
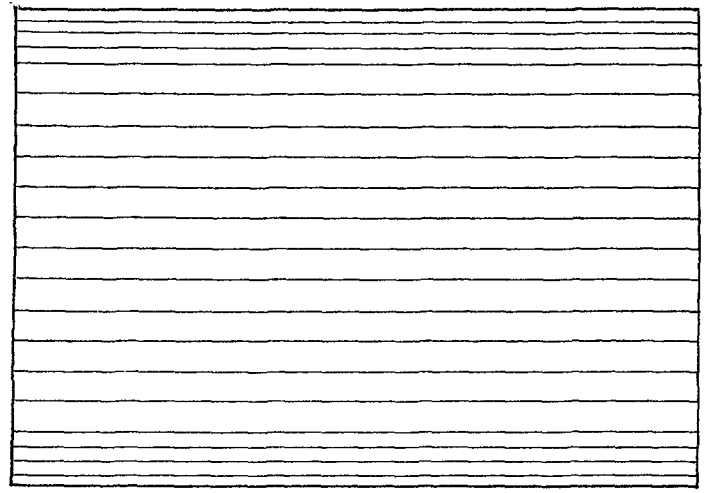
FIG. 12 shows a first possible functional representation for compression in the border area of the image section.
Figure 13:
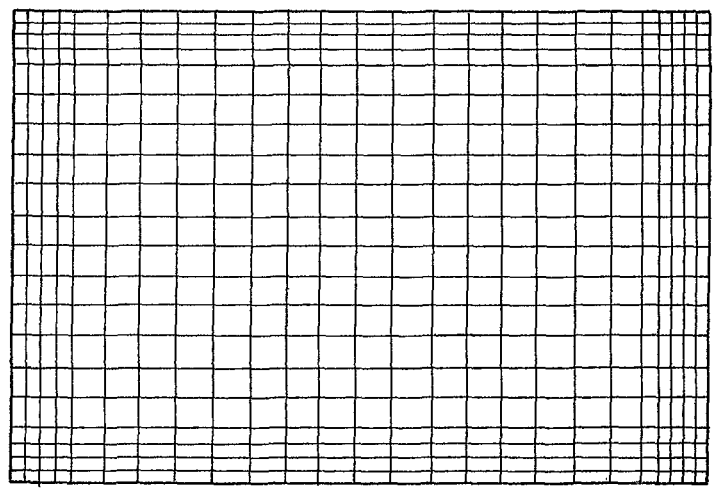
FIG. 13 shows a second possible function of representation for compression in the border area of the image section.

According to an alternatively or additionally applicable preferred embodiment of the present invention, the image section to be displayed is subjected, before representation, to a geometric transformation, by which the image section is compressed in at least one border area. FIG. 12 and FIG. 13 show possible compression functions of the representation in the border area. Only the upper and lower border areas in FIG. 12, and all border areas in FIG. 13, are compressed. The main area in the image center is preferably not distorted. It can even be actively equalized in order to compensate for distortions due to the recording. The compression increases in the border areas. In the present case, the compression increases monotonically. Thus, almost the pattern of a non-spherical mirror is reproduced. As a result of the compression in the border area, the environmental section can be selected to be larger in its entirety in the case of an unchanged display size of the image contents at the center of an environmental section to be represented. It is thus possible to prevent objects in the environment from being overlooked only because they are or were no longer contained in the environmental section determined. In the representation by the display unit, the border areas, as such, can be characterized in that a parting line is faded in between the undistorted main area and the distorted border area, as in the case of a non-spherical mirror.

According to an alternately or additionally applicable preferred embodiment of the present invention, the environmental section represented can be adapted depending on the operator's head and/or eye movements. For example, a so-called "vehicle interior camera system" is known that continuously records and evaluates the head position of the occupants (mainly for the adaptation of the restraint system of the vehicle). Such a system already existing for other purposes can also be used for the purposes of this embodiment of the present invention. In this way, a comfortable and intuitive operating option is made available to the operator for controlling the automatic selection of the environmental section. For example, the image displayed can be zoomed in more strongly when the driver's head is approaching the mirror. Likewise, if the driver moves his head sideways (relative to a hitherto average position of the driver's head), the displayed image can likewise pan slightly to the side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing information to a driver in a motor vehicle, the method comprising the acts of:
capturing an image flow containing images of at least one part of an environment of the motor vehicle using a recording device of the motor vehicle;
reproducing a selected image section of the image flow on a display unit in an interior of the motor vehicle, wherein the selected image section is a reduced section of the image flow corresponding to an environmental section of the environment of the motor vehicle;
arranging the selected image section within a display surface of the display unit in a position corresponding to that of the environmental section relative to the motor vehicle, wherein the display surface is larger than a display area of the selected image section;
automatically modifying via a display control unit of the motor vehicle the environmental section to be displayed for the driver by shifting the selected image section within the image flow, and wherein the position in which the selected image section is arranged within the display surface is shifted such that the position of the selected image section continues to correspond to the environmental section displayed for the driver following said automatically modifying; and
during the reproducing of the selected image section, in addition to a representation of the environmental section, displaying for the driver at least first optical information that indicates a position of the currently-represented environmental section relative to the motor vehicle, wherein the first optical information comprises a symbolic representation that is distinct from and in addition to the representation of the environmental section.

2. The method according to claim 1, wherein the display unit is integrated into a reflecting surface of a rear-view mirror of the motor vehicle or is formed as the reflecting surface of the rear-view mirror, and further comprising the act of transferring a display surface not used for representing the environmental section into a reflective state.

3. The method according to claim 1, wherein the image section is reproduced in a distorted manner corresponding to the position of the environmental section relative to the motor vehicle.

4. The method according to claim 1, wherein the image section is arranged, corresponding to the position of the environmental section relative to the motor vehicle, in a defined plane of a three-dimensional representation.

5. The method according to claim 1, wherein the image section is arranged, corresponding to a zoom factor or aperture angle used for determining the environmental section or resulting from the determination of the environmental section, in a defined plane of a three-dimensional representation.

6. The method according to claim 1, wherein the reproduction of the image section is accompanied by a symbolic representation of the position of the environmental section relative to the motor vehicle.

7. The method according to claim 1, wherein the reproduction of the image section is accompanied by one of a symbolic representation of a zoom factor and an aperture angle used for determining the environmental section or resulting from the determination of the environmental section.

8. The method according to claim 1, wherein the image section is compressed, at least intermittently, in at least one border area in relation to a central image area.

9. The method according to claim 1, wherein the display control unit determines at least one previous position of the motor vehicle and the display control unit adapts the environmental section as a function of the previous position of the motor vehicle.

10. The method according to claim 1, wherein automatically modifying the environmental section comprises adapting the captured image flow of the environment by at least one of panning the recording device and switching to another recording device.

11. The method according to claim 1, wherein automatically modifying the environmental section comprises performing a virtual camera pan or a virtual camera with respect to the environmental section displayed for the driver using the display unit.

12. The method according to claim 1, wherein the first optical information indicates a direction in which the currently-represented environmental section lies relative to the motor vehicle.

13. The method according to claim 1, where the symbolic representation is distinct from images captured by the recording device of the motor vehicle.

* * * * *